US010217173B2

(12) United States Patent
Murarka et al.

(10) Patent No.: US 10,217,173 B2
(45) Date of Patent: Feb. 26, 2019

(54) SOCIAL COVER FEED INTERFACE

(71) Applicant: Facebook, Inc., Menlo Park, CA (US)

(72) Inventors: Neel Ishwar Murarka, Portola Valley, CA (US); Niv Seker, San Francisco, CA (US); Adam Mosseri, San Francisco, CA (US); Francis Luu, San Francisco, CA (US); Carl Philip Sjogreen, San Francisco, CA (US); Cory Rudolph Ondrejka, Pleasant Hill, CA (US); Bret Steven Taylor, Los Gatos, CA (US); Luke St. Clair, Corte Madera, CA (US); Daniel Weaver, Redwood City, CA (US); Joshua Van Dyke Watzman, Cincinnati, OH (US); Daniel Schafer, San Francisco, CA (US); William S. Bailey, San Francisco, CA (US); Philip Fung, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 61 days.

(21) Appl. No.: 14/064,056

(22) Filed: Oct. 25, 2013

(65) Prior Publication Data
US 2014/0189524 A1    Jul. 3, 2014

Related U.S. Application Data

(63) Continuation-in-part of application No. 13/729,634, filed on Dec. 28, 2012.
(Continued)

(51) Int. Cl.
G06F 3/048    (2013.01)
G06Q 50/00    (2012.01)
(Continued)

(52) U.S. Cl.
CPC ......... *G06Q 50/01* (2013.01); *G06F 17/3089* (2013.01); *G06Q 30/0241* (2013.01)

(58) Field of Classification Search
None
See application file for complete search history.

(56) References Cited

U.S. PATENT DOCUMENTS 6,763,379 B1 * 7/2004 Shuster .............. G06Q 30/0264
                                                         709/219
8,312,500 B2    11/2012 Emerson
(Continued)

FOREIGN PATENT DOCUMENTS

CN    101005463    7/2007
CN    101167066    4/2008
(Continued)

OTHER PUBLICATIONS

International Search Report and Written Opinion for International Application PCT/US2013/078267, dated Apr. 28, 2014.
(Continued)

*Primary Examiner* — Hua Lu
(74) *Attorney, Agent, or Firm* — Baker Botts L.L.P.

(57) ABSTRACT

In one embodiment, user information for a user of a social-networking system is retrieved. Device information is determined for a device associated with the user. Based on the device information or the user information, content associated with the user is retrieved. Using the retrieved content, a content board is composed for use in a cover feed displayed on the device The content board may comprise a background image. Finally, the content board is sent to the device. In one embodiment, updated information for content associated with the user is retrieved. The updated information may be associated with content that was included in a previously-provided content board. Using the updated information, an update to the previously-provided content boards is composed. Finally, the updates may be sent to the previously-provided content boards to the device.

18 Claims, 22 Drawing Sheets

Related U.S. Application Data

(60) Provisional application No. 61/808,208, filed on Apr. 3, 2013.

(51) Int. Cl.
*G06F 17/30* (2006.01)
*G06Q 30/02* (2012.01)

(56) References Cited

U.S. PATENT DOCUMENTS

| | | | | |
|---|---|---|---|---|
| 8,315,616 | B2* | 11/2012 | Martinez | H04M 1/72522 455/418 |
| 8,655,307 | B1* | 2/2014 | Walker | H04W 52/0212 455/405 |
| 2007/0192369 | A1 | 8/2007 | Gross | |
| 2007/0259673 | A1* | 11/2007 | Willars | H04W 52/0225 455/453 |
| 2008/0040474 | A1* | 2/2008 | Zuckerberg | G06Q 30/02 709/224 |
| 2008/0070209 | A1* | 3/2008 | Zhuang | G06Q 10/10 434/236 |
| 2008/0096505 | A1 | 4/2008 | Martinez | |
| 2009/0021486 | A1* | 1/2009 | Chaudhri | G06F 9/4443 345/173 |
| 2009/0061837 | A1* | 3/2009 | Chaudhri | G06F 3/0481 455/418 |
| 2010/0095208 | A1* | 4/2010 | White | G06F 17/30905 715/704 |
| 2010/0105440 | A1* | 4/2010 | Kruzeniski | G06F 3/0482 455/566 |
| 2010/0146384 | A1* | 6/2010 | Peev | H04M 1/673 715/255 |
| 2010/0280904 | A1* | 11/2010 | Ahuja | G06Q 30/02 705/14.58 |
| 2010/0299634 | A1* | 11/2010 | Cho | G06F 3/0482 715/810 |
| 2010/0321587 | A1 | 12/2010 | Kerofsky | |
| 2011/0087842 | A1* | 4/2011 | Lu | G06F 17/30867 711/126 |
| 2011/0276396 | A1* | 11/2011 | Rathod | G06F 17/30867 705/14.49 |
| 2012/0023390 | A1* | 1/2012 | Howes | G06F 17/30864 715/205 |
| 2012/0076367 | A1* | 3/2012 | Tseng | G06K 9/00288 382/118 |
| 2012/0079045 | A1* | 3/2012 | Plotkin | H04L 51/12 709/206 |
| 2012/0079606 | A1 | 3/2012 | Evans | |
| 2012/0089690 | A1* | 4/2012 | Hein | G06Q 10/10 709/206 |
| 2012/0095979 | A1* | 4/2012 | Aftab | G06F 17/30867 707/706 |
| 2012/0096037 | A1 | 4/2012 | Sittig | |
| 2012/0102114 | A1* | 4/2012 | Dunn | G06Q 10/10 709/204 |
| 2012/0133486 | A1 | 5/2012 | Park | |
| 2012/0170451 | A1* | 7/2012 | Viswanathan | H04W 4/005 370/230 |
| 2012/0214442 | A1* | 8/2012 | Crawford | H04W 12/06 455/411 |
| 2012/0226564 | A1* | 9/2012 | Mirrokni Banadaki | G06Q 30/0254 705/14.66 |
| 2012/0272230 | A1* | 10/2012 | Lee | G06F 1/329 717/173 |
| 2012/0278475 | A1* | 11/2012 | Papakipos | G06Q 10/10 709/224 |
| 2012/0284297 | A1* | 11/2012 | Aguera-Arcas | G06F 21/629 707/769 |
| 2012/0290953 | A1* | 11/2012 | Russell | H04N 21/4756 715/758 |
| 2012/0290972 | A1* | 11/2012 | Yook | G06F 3/0482 715/800 |
| 2012/0310922 | A1 | 12/2012 | Johnson | |
| 2012/0311033 | A1* | 12/2012 | Tseng | G06Q 30/0269 709/204 |
| 2012/0323933 | A1* | 12/2012 | He | G06Q 10/107 707/749 |
| 2012/0324041 | A1 | 12/2012 | Gerber | |
| 2012/0324094 | A1* | 12/2012 | Wyatt | H04W 4/60 709/224 |
| 2012/0331548 | A1* | 12/2012 | Tseng | H04M 1/67 726/19 |
| 2013/0031172 | A1* | 1/2013 | Olsen | H04L 51/28 709/204 |
| 2013/0060841 | A1* | 3/2013 | Knight | G06F 17/30035 709/203 |
| 2013/0069962 | A1* | 3/2013 | Nealer | H04M 1/72544 345/522 |
| 2013/0110978 | A1* | 5/2013 | Gordon | H04N 21/2665 709/218 |
| 2013/0117451 | A1* | 5/2013 | Du | H04L 63/10 709/225 |
| 2013/0132854 | A1* | 5/2013 | Raleigh | G06F 3/0482 715/738 |
| 2013/0162667 | A1* | 6/2013 | Eskolin | G06F 3/0488 345/619 |
| 2013/0167041 | A1* | 6/2013 | Huang | G06F 3/0485 715/753 |
| 2013/0191775 | A1* | 7/2013 | Lawson | G06F 3/0482 715/784 |
| 2014/0189056 | A1 | 7/2014 | St. Clair | |
| 2014/0189531 | A1 | 7/2014 | Murarka | |
| 2014/0189539 | A1 | 7/2014 | St. Clair | |
| 2014/0230025 | A1* | 8/2014 | Abhyanker | G06Q 10/087 726/4 |

FOREIGN PATENT DOCUMENTS

| | | |
|---|---|---|
| CN | 101438612 A | 5/2009 |
| CN | 101960444 A | 1/2011 |
| CN | 102109945 | 6/2011 |
| CN | 102150175 A | 8/2011 |
| CN | 102395993 | 3/2012 |
| CN | 102402661 | 4/2012 |
| CN | 102576366 A | 7/2012 |
| CN | 102685026 | 9/2012 |
| CN | 102790831 | 11/2012 |
| EP | 2068236 A1 | 6/2009 |
| EP | 2 363 833 A1 | 9/2011 |
| JP | 2006/099532 | 4/2006 |
| JP | 2006-139778 | 6/2006 |
| JP | 2009-15379 | 1/2009 |
| JP | 2009-212997 | 9/2009 |
| JP | 2010/500650 | 1/2010 |
| JP | 2010-523046 | 7/2010 |
| JP | 2011-130104 | 6/2011 |
| JP | 2012-527700 | 11/2012 |
| KR | 10-2012-0088784 | 8/2012 |
| KR | 101194766 B1 | 10/2012 |
| WO | WO 2011/052083 A1 | 5/2011 |
| WO | WO 2011/070366 A1 | 6/2011 |
| WO | WO 2011-163204 A2 | 12/2011 |
| WO | WO 2012/078079 A2 | 6/2012 |
| WO | WO 2012/112780 | 8/2012 |
| WO | WO 2012/166876 A2 | 12/2012 |

OTHER PUBLICATIONS

EP Communication for 13195616.1-1959, dated Mar. 17, 2015.
International Search Report and Written Opinion for International Application PCT/US2013/073248, dated Mar. 14, 2014.
International Search Report and Written Opinion for International Application PCT/US2013/078302, dated Jun. 3, 2013.
International Search Report and Written Opinion for PCT/US2013/078316, dated Apr. 15, 2014.
Non-Final Rejection for U.S. Appl. No. 13/729,634, dated Jan. 6, 2015.
European Search Report 13195616.1-195827, dated Feb. 27, 2014.

(56) References Cited

OTHER PUBLICATIONS

Communication, European Patent Office, Application No. 13195616.1, dated Nov. 29, 2016.
EPO Communication, Supplementary European Search Report and Annex to the European Search Report for Application No. EP 13 86 7468, dated Jul. 19, 2016.
EPO Communication, Supplementary European Search Report and Annex to the European Search Report for Application No. EP 13 86 8262, dated Jul. 19, 2016.
Communication, Supplementary European Search Report, Annex to the European Search Report, European Patent Office, European Patent Application No. 13 86 6729, dated Nov. 3, 2016.
Notification of the First Office Action, The State Intellectual Property Office of the People's Republic of China, Patent Application No. 2013800735567 (with English translation), dated May 2, 2017.
Notification of the First Office Action, The State Intellectual Property Office of the People's Republic of China, Patent Application No. 2013800739905 (with English translation), dated Mar. 8, 2017.
Decision to refuse a European Patent application, European Patent Office, Patent Application No. 13 195 616.1, dated Mar. 9, 2017.
Ayumi Fukaya, "How to use Facebook Timeline: From cover photo to privacy setting", book, Nov. 15, 2011, p. 2-4,URL, https://web.archive.org/web/20121224072106/http://socialmediaexperience.jp/4494, Nov. 15, 2011.
1st Requirement of Substantive Examination PLI PCT, Mexican Institute of Industrial Property, Patent Application No. MX/a/2015/008431 (with English translation), Oct. 20, 2017.
Notification of the Second Office Action, The State Intellectual Property Office of the People's Republic of China, Patent Application No. 2013800735567 (with English translation), Nov. 6, 2017.
Notification of Reasons for Rejections, Japan Patent Office, Patent Application No. 2015-550837 (with English translation), dated Nov. 7, 2017.
Notification of Reasons for Rejection, Japan Patent Office, Patent Application No. 2015-550844 (with English translation), dated Nov. 14, 2017.
Examination report No. 1 for standard patent application, Australian Government, Patent Application No. 2013370178, dated Nov. 23, 2017.
Usability dramatically improvement, mobileASCII vol. 9, book, ASCII MediaWorks Corporation, Feb. 29, 2012, vol. 9, p. 18-19 (without English translation), Feb. 29, 2012.
Morishima Ryoko, Appendix of April issue of Androider +, Book for the first time on Facebook, Impress Japan Co., Ltd., Sep. 6, 2012, p. 55 (without English translation), Sep. 6, 2012.
Notification of Reasons for Rejection, Japan Patent Office, Patent Application No. 2015-550419 (with English translation), dated Oct. 10, 2017.
Notice of Allowance, Korean Intellectual Property Office, Patent Application No. 10-2015-7020547 (with English translation), dated Oct. 27, 2017.
Decision of Rejections for Application No. 2013/800735567 from The State Intellectual Property Office of the People's Republic of China, dated Apr. 3, 2018.
Notification of Reasons for Rejection, Japan Patent Office, Patent Application No. 2015-550842 (with English translation), dated Jan. 17, 2018.
Communication Pursuant to Article 94(3) EPC regarding Application No. 13 866 729.01-1222 from European Patent Office, dated Mar. 8, 2018.
Notification of the First Office Action, The State Intellectual Property Office of the People's Republic of China, Patent Application No. 201380073991X, dated Nov. 3, 2017.
Notification of the First Office Action from The State Intellectual Property Office of the People's Republic of China for Application No. 2013-800738921(with English Translation), dated Jan. 30, 2018.
Communication pursuant to Article 94(3) EPC from European Patent Office for Application No. 13 867 468.4-1222, dated Jan. 25, 2018.
Communication pursuant to Article 94(3) EPC from European Patent Office for Application No. 13 868 262.01-1222, dated Jan. 30, 2018.
Decision of Rejection for Application No. 2015-550837 from Japanese Patent Office, dated May 22, 2018.
Notification of the Second Office Action regarding Application No. 201380073991X from The State Intellectual Property Office of the People's Republic of China, dated Jun. 4, 2018.
AU Office Action received from AUIPO for Patent Application No. 2013370163, dated Jun. 29, 2018.
JP OA received from JPO for Patent Application No. 2015-550419. (with English Translation), dated Jul. 3, 2018.
CA Office Action received for Patent Application No. 2,895,263, dated Jul. 12, 2018.
IL Office Action received for Patent Application No. 239590. (with English Translation), dated Jun. 21, 2018.
AU Office Action received for Patent Application No. 2013370175. dated Aug. 25, 2018.
IL Office Action received for Patent Application No. 239587. (with English Translation), dated Jun. 21, 2018.
CN Office Action received for Patent Application No. 2013800738921. (with English Translation), dated Sep. 3, 2018.
AU Office Action received for Patent Application No. 2013368326, dated Sep. 26, 2018.
MX Office Action received for Patent Application No. MX/a/2015/008430. (with English Translation), dated Sep. 19, 2018.
MX Office Action received for Patent Application No. MX/a/2015/008447. (with English Translation), dated Sep. 25, 2018.
CN Office Action received for Patent Application No. 2013800735567. (with English Translation), dated Nov. 5, 2018.
MX Office Action received for Patent Application No. MX/a/2015/008452. (with English Translation), dated Nov. 14, 2018.

* cited by examiner

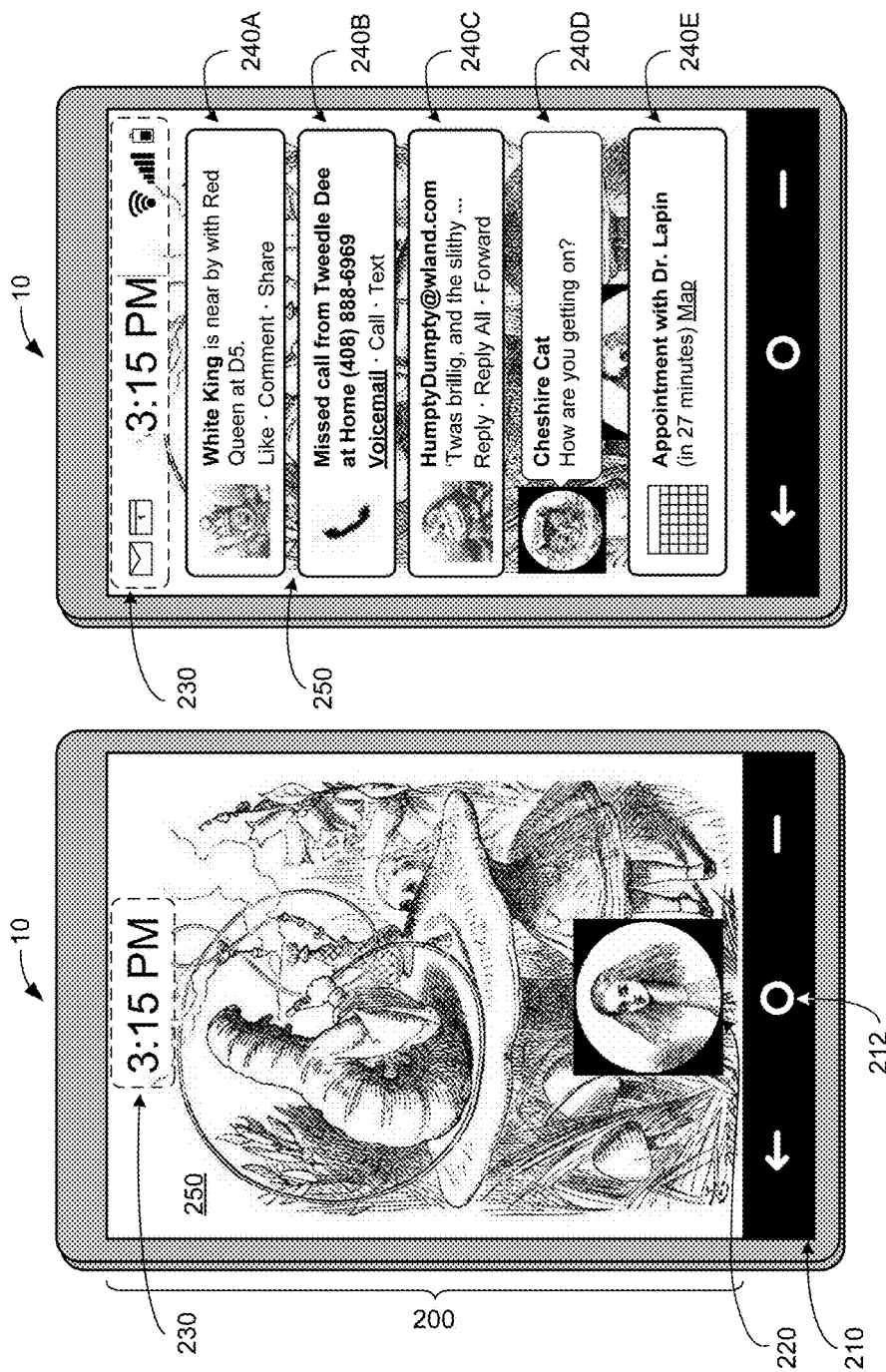

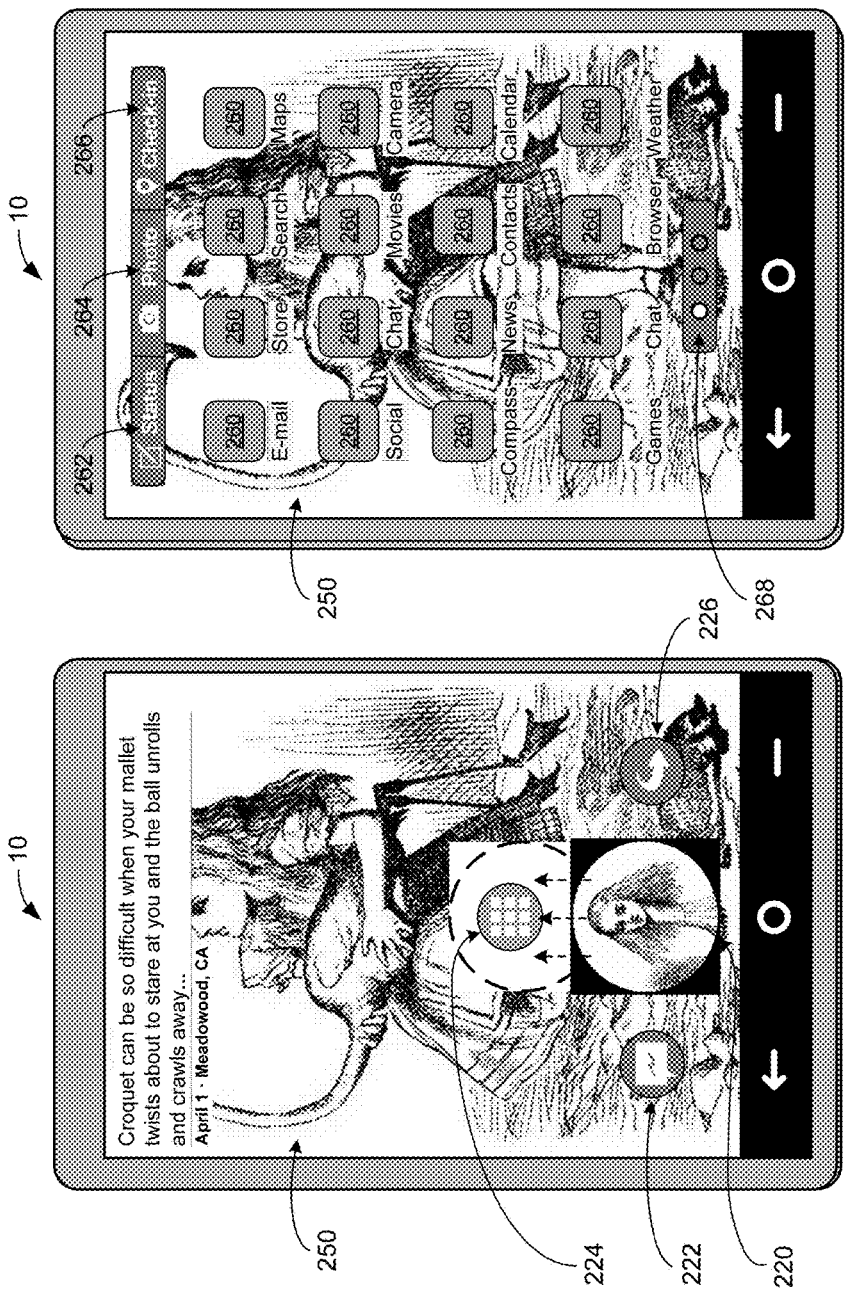

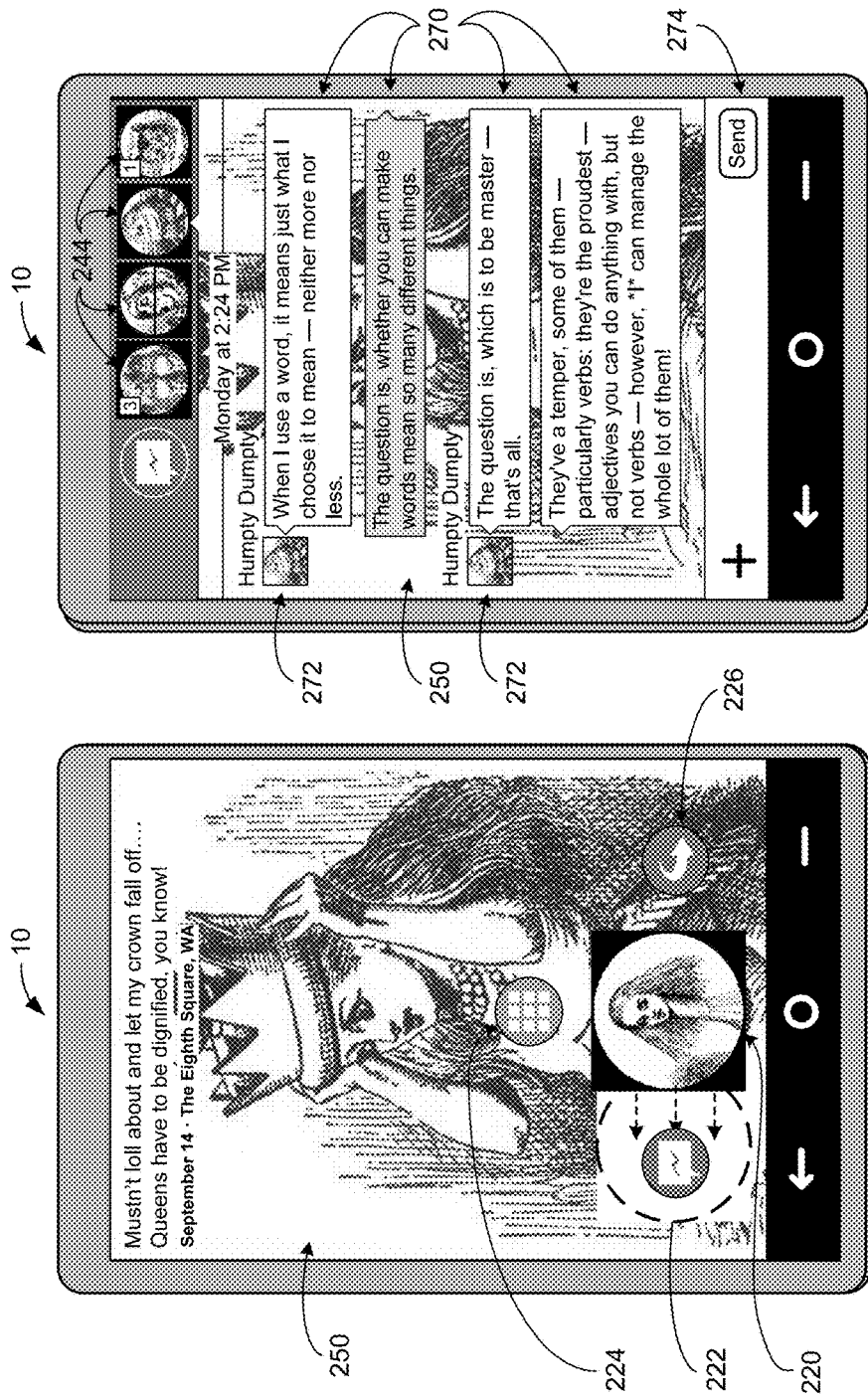

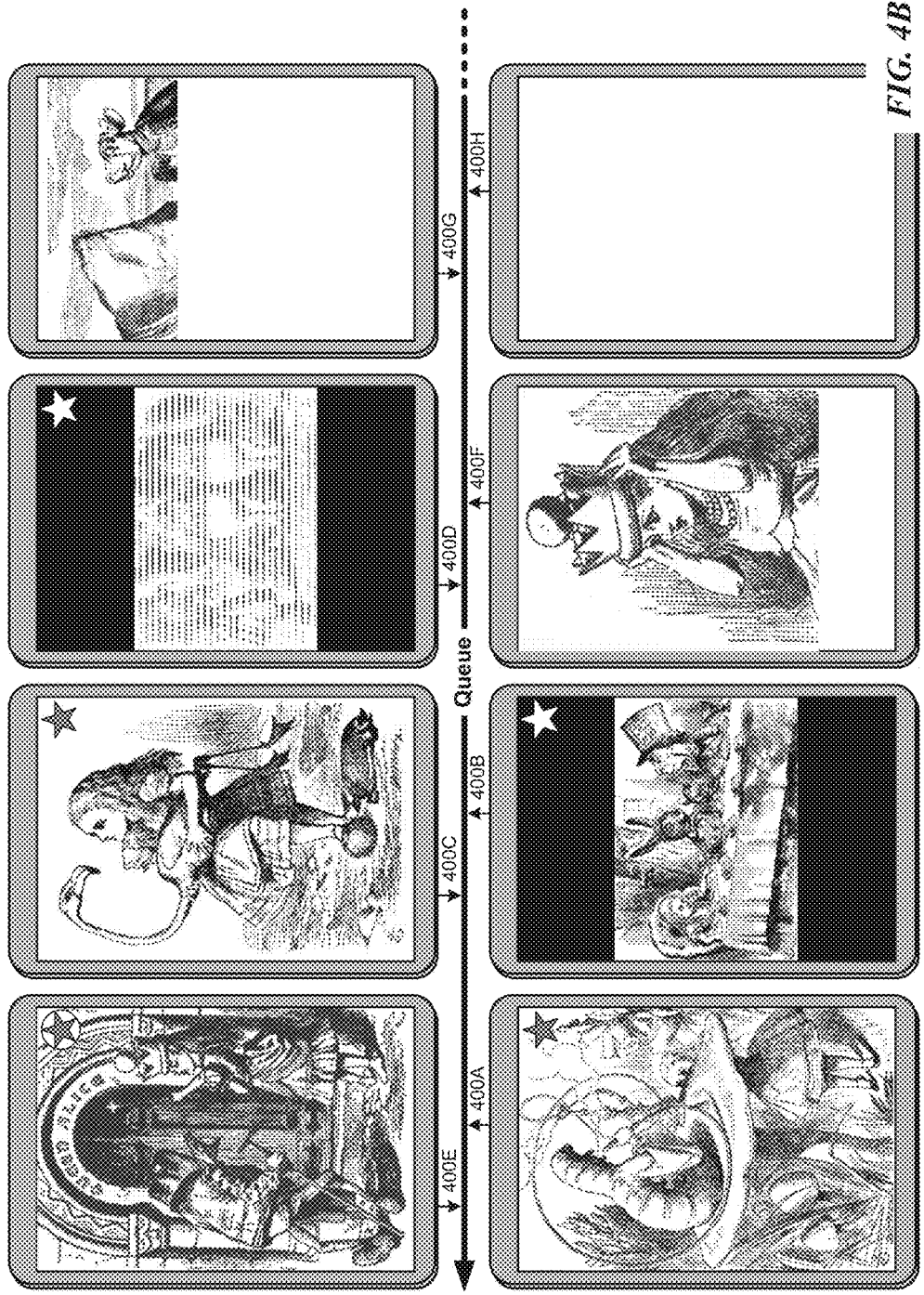

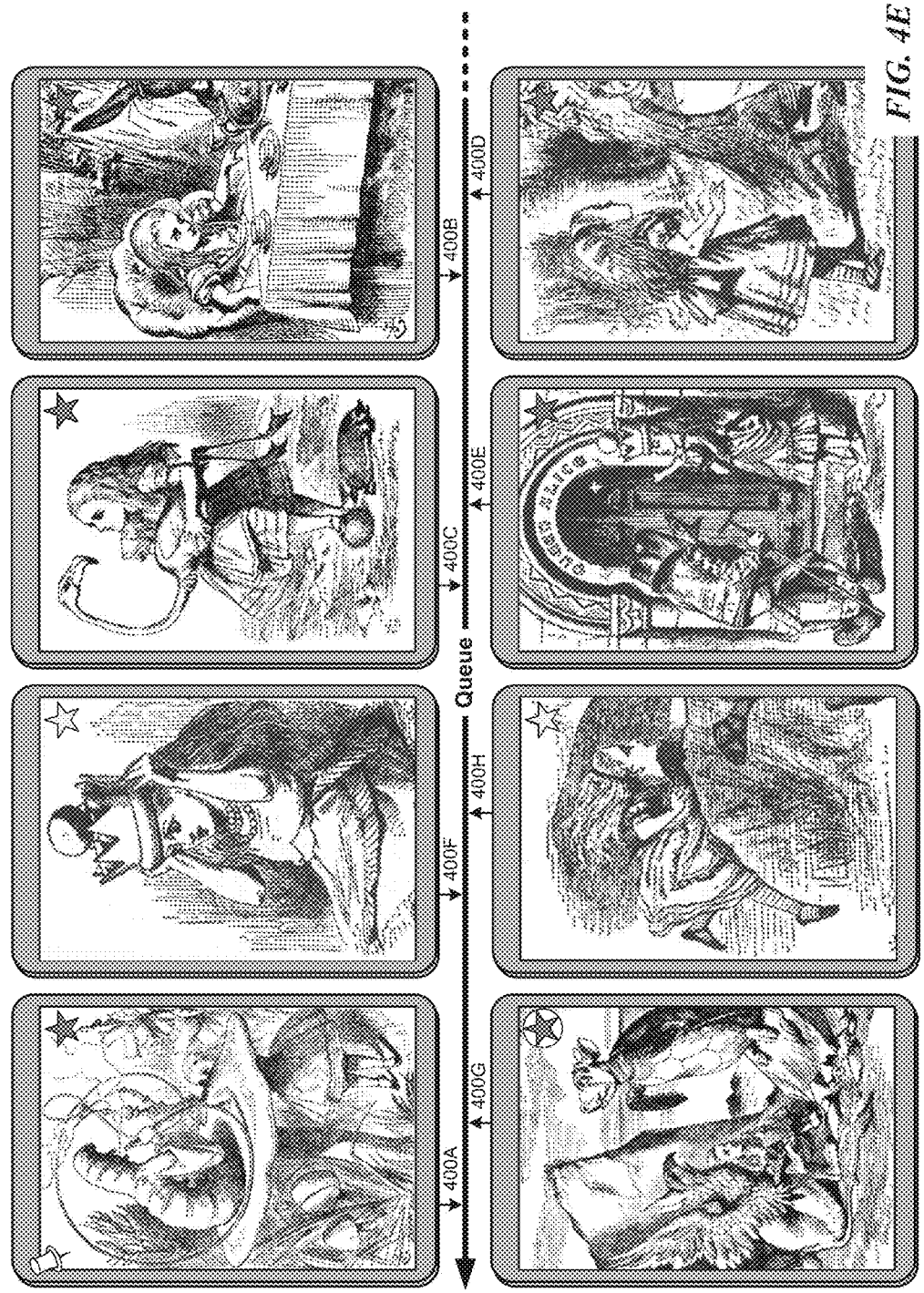

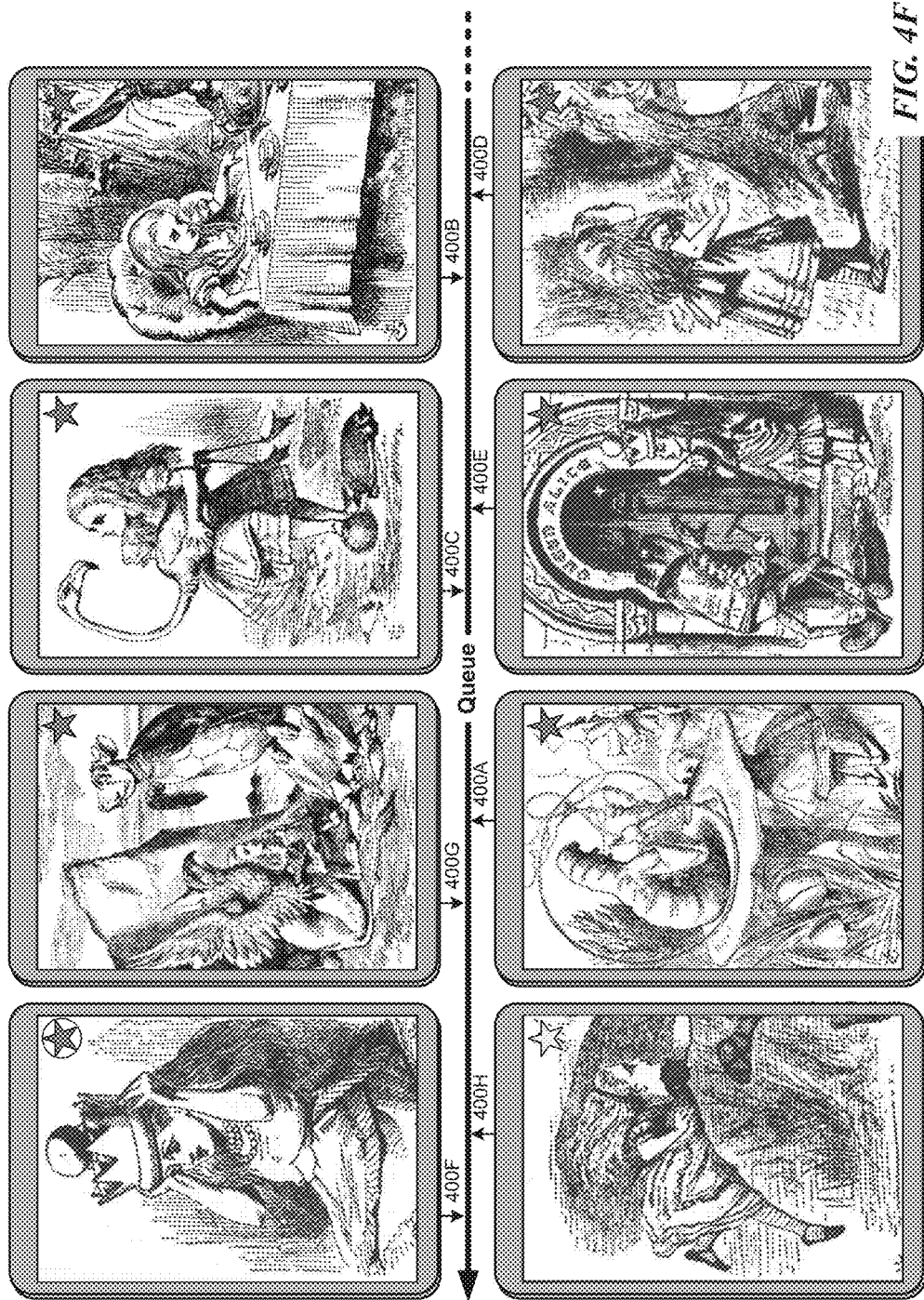

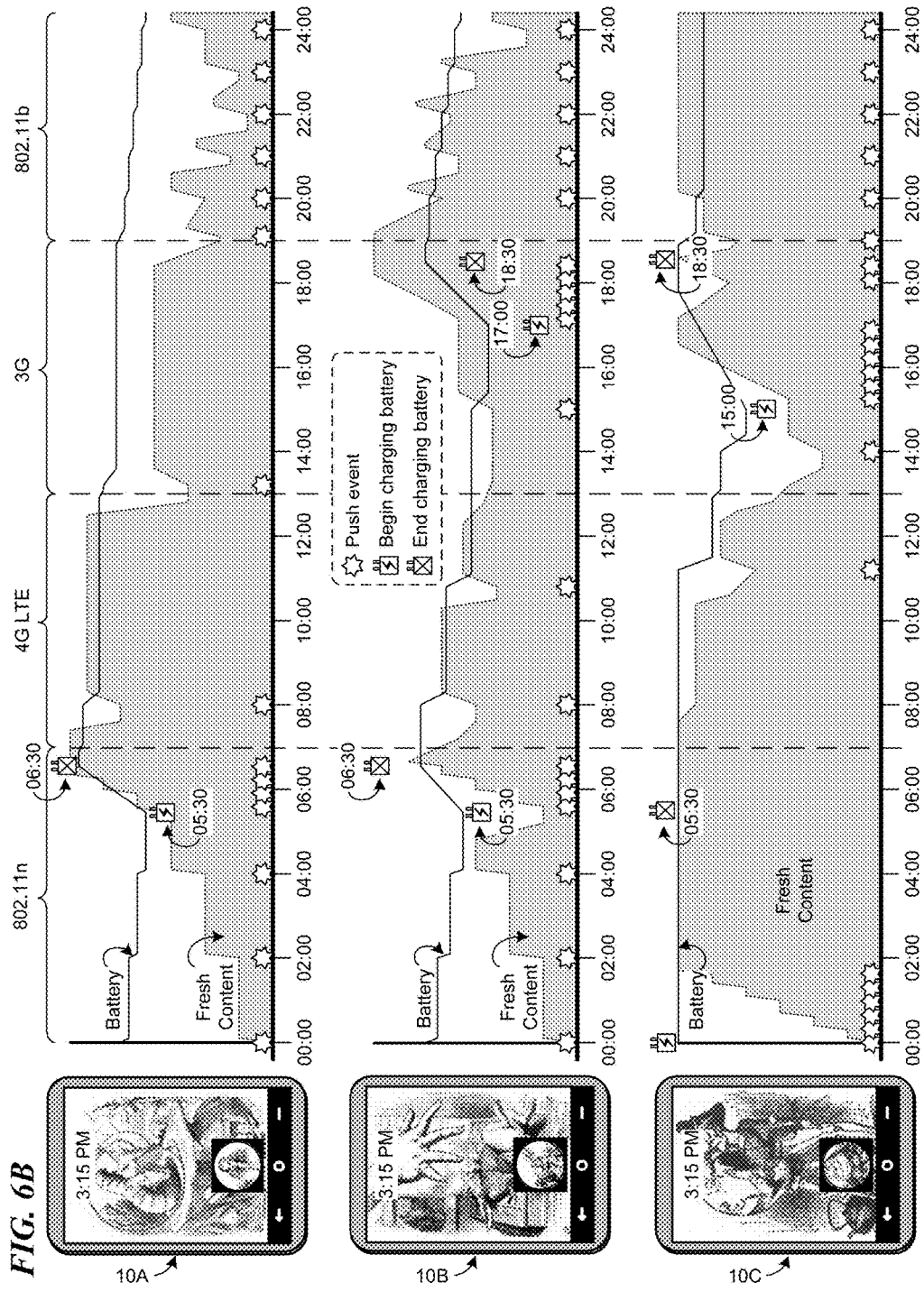

SOCIAL COVER FEED INTERFACE

RELATED APPLICATIONS

This application is a continuation-in-part under 35 U.S.C. § 120 of U.S. patent application Ser. No. 13/729,634, filed 28 Dec. 2012 and titled "Socialized Dash," which is incorporated herein by reference. This application also claims the benefit, under 35 U.S.C. § 119(e), of U.S. Provisional Patent Application No. 61/808,208, filed 3 Apr. 2013 and titled "Consumption-Based Content Promotion," which is incorporated herein by reference.

TECHNICAL FIELD

[This disclosure generally relates to presentation of a graphical user interface (GUI) on mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY

In particular embodiments, a socialized dash may appear as a "home" screen of a mobile device. The socialized dash may be provided for display when the user, by way of example and not limitation, presses the "home" button, pulls down a top-level menu, locks the mobile device, closes an application, or makes or ends a call using the mobile device. In particular embodiments, the socialized dash may include interactive elements that correspond to social-networking functionality. In particular embodiments, the socialized dash may include an area to display social-action notifications from social-networking system, such as for example the newsfeed and notifications, along with incoming messages (e.g., missed-call information, SMS message, or system messages).

The user may be able to interact with the elements on the socialized dash (or a limited subset thereof) without launching an application or unlocking the mobile device. For example, the user may comment on or "like" a status update or SMS message or accept/decline a calendar invitation from the socialized dash. The elements displayed by the socialized dash may be updated in real-time as content is being generated or uploaded to the social-networking system.

In particular embodiments, the socialized dash (or a subset of functionality thereof) may appear on or be integrated with the lock screen of the mobile device. In particular embodiments, tension scrolling of the socialized dash may be performed to unlock the mobile device. In particular embodiments where the user has a PIN lock, tension scrolling of the socialized dash will take the user to the PIN screen.

In particular embodiments, the appearance of the socialized dash may be customized for a user of a social-networking system. For example, a cover feed interface (appearing either in the background or in the foreground) on the socialized dash may comprise a series of content boards, each of which may include the profile picture of the user, other content (e.g., images and/or text) associated with the user's profile, content associated with social-networking users or entities connected to or otherwise associated with the user (e.g., newsfeed content), content associated with social-networking users or entities sharing an affinity with the user, or sponsored stories (including advertisements).

In particular embodiments, the series of content boards appearing in the cover feed interface may be periodically updated with new content boards and/or updates to content boards already cached on the mobile device. Since any given mobile device may have a limit on the number of content boards that can be cached on the mobile device for display even when no network connection is available, the series of content boards appearing in the cover feed interface may also be periodically re-assessed to determine an appropriate order for display so as to ensure that different rules and/or principles are upheld, such as, for example: promoting new content boards and/or updated content boards. In particular embodiments, the content board order assessment may occur completely or at least in part at the server; in order to enable server-side assessment, the mobile device may periodically transmit a content-board-viewing history back to the server. In particular embodiments, the content board order assessment may occur in part at the server, which then pushes the content board order, any new content boards, and any updates to cached content boards out to the mobile device, and then in part at the mobile device, which may re-assess the content board order according to device-based information.

In particular embodiments, a first phase of the content board order assessment may occur at the server, in order to uphold particular rules and/or principles that may be more easily assessed by the server, such as, for example: promoting content boards according to relevance to the user and/or popularity within a group of users. In particular embodiments, a second phase of the content board order assessment may occur at the mobile device, in order to uphold particular rules and/or principles that may be more easily assessed by the mobile device, such as, for example: promoting content boards for which all elements thereof have been completely downloaded and cached on the mobile device; and promoting content boards having background images whose orientation corresponds to the current orientation of the screen of the mobile device. Other rules and/or principles may include, for example: promoting content boards including content associated with a social connection of the mobile device owner, wherein the mobile device has recently received or sent a communication associated with the social connection; and/or retaining cached content boards (and refraining from retrieving new content boards) when data transfer to and/or from the mobile device approaches a usage threshold.

In particular embodiments, the server may push a "wake" command or waking schedule out to a device periodically and/or push the content board order, any new content boards, and any updates to cached content boards out to the mobile device. Each time a device "wakes," resource consumption may be triggered (e.g., battery power consumed and/or data transferred when activating one or more radios, searching for one or more networks, and negotiating a connection to a network). In particular embodiments, the server may maintain and send to each mobile device, a schedule for pushing content and/or other data to the device. In particular embodiments, the server may maintain and send, to each mobile device, a schedule for initiating client-side commands to wake the mobile device and to pull content and/or other data from the server.

In particular embodiments, such schedules are designed to control resource consumption by the device, in order to, for example, extend battery life (and avoid exceeding a charge threshold) and/or reduce network data transfer usage (and avoid exceeding a data transfer limit imposed by a cellular service provider). In particular embodiments, such schedules may also be designed to control resource consumption so as to promote uniform battery life across multiple devices, e.g., waking power-efficient devices more often than less power-efficient devices, waking less power-efficient devices more often than power-efficient devices when they are plugged in and charging the battery, waking less power-efficient devices more often than power-efficient devices when they are connected to a network by a low-power radio, etc.

Upon receiving such a schedule, a device may determine when and how often to initiate waking events, based on the schedule, in order to reduce the waking frequency. For example, if a radio on the device is already actively connected to a network, the device may choose to pull content and/or data from the server ahead of schedule, in order to avoid triggering an additional waking event. Conversely, if no radio on the device is currently actively connected to a network, the device may choose to delay triggering a waking event (e.g., up to 30 seconds), in case another event on the device ends up triggering a waking event during the delay period. If such a fortuitous event does occur within the delay period, the device may piggyback on the triggered waking event by using the established network connection to pull content and/or data from the server; else, the device may simply trigger a waking event at the end of the delay period.

BRIEF DESCRIPTION OF THE DRAWINGS

FIGS. 2A-2B illustrate the device with an example socialized dash and cover feed.

FIGS. 2J-2K illustrate an example app launcher feature of the socialized dash.
FIGS. 2L-2M illustrate an example chat feature of the socialized dash.
FIGS. 4A-4F illustrate states of a queue of example content boards during operation of an example ranking algorithm for content boards in a cover feed.
FIGS. 6A-6C illustrate parallel event timelines for three example devices during operation of an example resource-consumption algorithm for serving content boards.

DESCRIPTION OF EXAMPLE EMBODIMENTS

Figure 1:
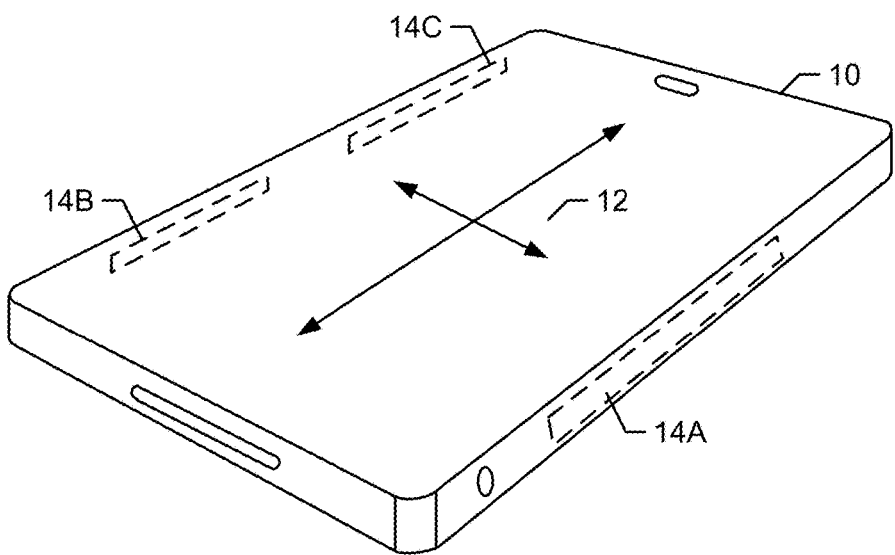
FIG. 1 illustrates an example mobile computing device.

FIG. 1 illustrates an example mobile computing device. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 1, touch sensor 12 is incorporated on a front surface of mobile computing device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile device many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

FIG. 2A-2B illustrate mobile computing device 10, which is associated with an example social-networking user Alice Liddell. Mobile computing device 10 includes a displayable region 200 and a navigation bar 210. In particular embodiments, mobile computing device 10 may display a socialized dashboard or "socialized dash" in displayable region 200 that is a user interface (UI) that may be displayed on mobile computing device 10 when the user is not actively interacting with an application executed on mobile computing device 10. In particular embodiments, the socialized dash may be constantly accessible (i.e., "persistent"). As an example and not by way of limitation, a persistent UI or socialized dash may be an application that functions as a home or default screen of mobile computing device 10, as described below. In particular embodiments, displayable region 200 includes a control bauble 220, which may display an image associated with the user of mobile device 10 (e.g., Alice's profile picture). Control bauble 220 may provide a convenient shortcut to perform several different actions on mobile computing device 10 and is described in further detail with respect to FIGS. 2J-2M. In particular embodiments, displayable region 200 may also include a status region 230. Status region 230 may display a variety of status information, such as, for example, just the current time, as shown in FIG. 2A, or more detailed information, as shown in FIG. 2B.

As shown in FIG. 2B, in particular embodiments, certain notifications and/or feed items 240A-240E displayed in a socialized dash may be displayed as an overlay of the underlying user interface (e.g., notifications regarding incoming email/text/voicemail messages, social-action notifications regarding check-ins/tags/comments/likes/messages/invitations, and device-based notifications regarding alarms/system alerts/reminders/status alerts). The socialized dash may dynamically aggregate various types of incoming messages, social-activity notifications, or content objects from applications installed on mobile computing device 10, or from the social-networking system or third-party system through a communication protocol. In particular embodiments, the display of mobile computing device 10 may be locked, preventing all or selected interactions with mobile computing device 10. The socialized dash may function as a lock screen when mobile computing device 10 is in a locked mode. In particular embodiments, when the socialized dash is functioning as a lock screen, the user may be able to access all or a subset of all the features of the socialized dash available to the user during normal operation of mobile computing device 10.

In particular embodiments, the notifications and/or feed items 240 may be updated based at least in part on interactions with the social-networking system, as illustrated in FIG. 2A. As illustrated in the example of FIG. 2B, social-action notifications associated with the newsfeed or ticker may be added in real-time as content on the social-networking system is being generated or uploaded to the social-networking system by users with a relationship to the user of mobile computing device 10 based at least in part on social-graph information, as illustrated in the example of FIG. 2B. As another example, the newsfeed or ticker associated with the user may be updated in real-time on the social-networking system in response to interaction with the social-networking system through content-related social-networking interactive elements 242. Although this disclosure describes particular interactions with particular content objects displayed on the socialized dash, this disclosure contemplates any suitable interactions with any suitable content objects displayed on the socialized dash. Moreover, this disclosure contemplates a socialized dash with an area for displaying any suitable content objects, such as for example, stock price alerts, news notifications, or RSS (really simple syndication) feed.

As an example and not by way of limitation, the incoming messages may include e-mail, Short Message Service (SMS) or Multimedia Messaging Service (MMS) messages, voice mail, missed telephone calls, instant messages (IM), messages provided by a feature of the social-networking system, etc. As another example, social-action notifications may include notification of actions by other users on the social-networking system that relate to the user, such as for example, friend requests, social events, or social calendars. As another example, social-action notifications may include notifications of actions by other users on the social-networking system, such as for example, status updates, comments, blog posts, or "Likes" of other users the social-networking system. In the example of FIG. 2B, notifications and/or feed items 240 may include newsfeed or ticker items associated with a newsfeed or ticker provided by the social-networking system. In particular embodiments, the newsfeed or ticker items may be based on information related to actions by social-networking users connected in the social graph to the user of mobile computing device 10.

In particular embodiments, social-action notifications may be periodically pushed (i.e., wherein transmission is initiated by a server without first receiving a request from mobile computing device 10) by, for example, a server of the social-networking system, to mobile computing device 10. Alternatively or in addition, mobile device 10 may pull (i.e., wherein transmission is initiated by mobile computing device 10 sending a request to a server) social-action notifications to mobile computing device 10. As an example and not by way of limitation, the notifications and/or feed items 240 may be natively generated from applications installed on mobile computing device 10, generated in connection with the social-networking system, or generated by third-party systems, such as for example, a news aggregator. Although this disclosure illustrates and describes a socialized dash with an area for displaying particular content objects, this disclosure contemplates a socialized dash with an area for displaying any suitable content objects, such as for example, stock price alerts, news notifications, or RSS (really simple syndication) feeds.

Particular embodiments of a socialized dash may comprise a "cover feed" interface 250 (as shown in FIGS.

2A-2M) that emphasizes the aesthetic look and feel of the user interface (more like a magazine or a coffee table book, as opposed to a newspaper), in order to personalize mobile computing device 10 for a particular user (e.g., Alice). In the examples illustrated in FIGS. 2A-2B, cover feed 250 comprises a content board including a background image from Alice's social-networking profile (e.g., a photo from one of Alice's albums).

Cover feed 250 may comprise one or more content boards, each of which may incorporate content (such as text, video, an image for display in the background (as shown throughout FIGS. 2A-2M), or application-driven animated images, such as a stock ticker, a map tracking the movement of any first-degree social-graph connections within the user's immediate vicinity, or a live chart tracking the top ten most-popular hashtags being used by the user's social-graph connections), generic information associated with the content (e.g., size, file type, date and/or time that an image was captured and/or posted, resolution, aspect ratio), social-networking information associated with the content (e.g., a caption associated with the image (as shown in FIGS. 2C-2F, 2H, 2J, and 2L), tags identifying people or objects appearing in the image and single-point or area coordinates for each tagged item, status information (as shown in FIGS. 2C-2F and 2H) indicating how many people have "liked" an image, "censored" an image, or commented on an image), and/or social-networking interactive elements, such as, by way of example and not limitation, a button to "Like" a friend's posting or to comment on a friend's posting. In particular embodiments, a content board of cover feed 250 may comprise content stored on, sent from, and/or received by the mobile computing device 10, content retrieved from the user's social-networking profile and/or social graph, content retrieved from the user's other online communication accounts, third-party content deemed relevant to the user, sponsored stories, advertisements, or content based on the user's current location (e.g. events about to occur near the user's position, or weather conditions or a forecast for the current location).

As an example and not by way of limitation, the background image of cover feed 250 may be a picture associated with the social-network ID of the user, such as for example, a profile picture. In some embodiments, the background image of cover feed 250 may be a picture associated with another user or entity or concept represented by a node in a social graph associated with the social network, with a sponsored story or advertisement, or with other third-party content, such as a background image, icon, logo, or avatar provided by a third-party website or a screenshot of a third-party website. In some embodiments, the background image of cover feed 250 may be a video or animated image. In some embodiments, in place of (or in addition to) the background image, the socialized dash may present audio or other multimedia effects.

In particular embodiments, the socialized dash may be displayed in different device states (e.g., upon locking/unlocking mobile computing device 10, upon pressing "home" button 212 in navigation bar 210, upon powering on mobile computing device 10, upon closing an application, upon switching mobile computing device 10 to silent, or upon disabling/enabling network connectivity). In particular embodiments, the particular content board(s) displayed in cover feed 250 may vary depending on device state (e.g., if the device has just been powered on, display a content board with an image stored by the user to their user profile, or if the device is running low on battery or does not have network connectivity, cease to download additional content to generate new content boards and just utilize cached content boards).

Figures 2C, 2D, 2E:
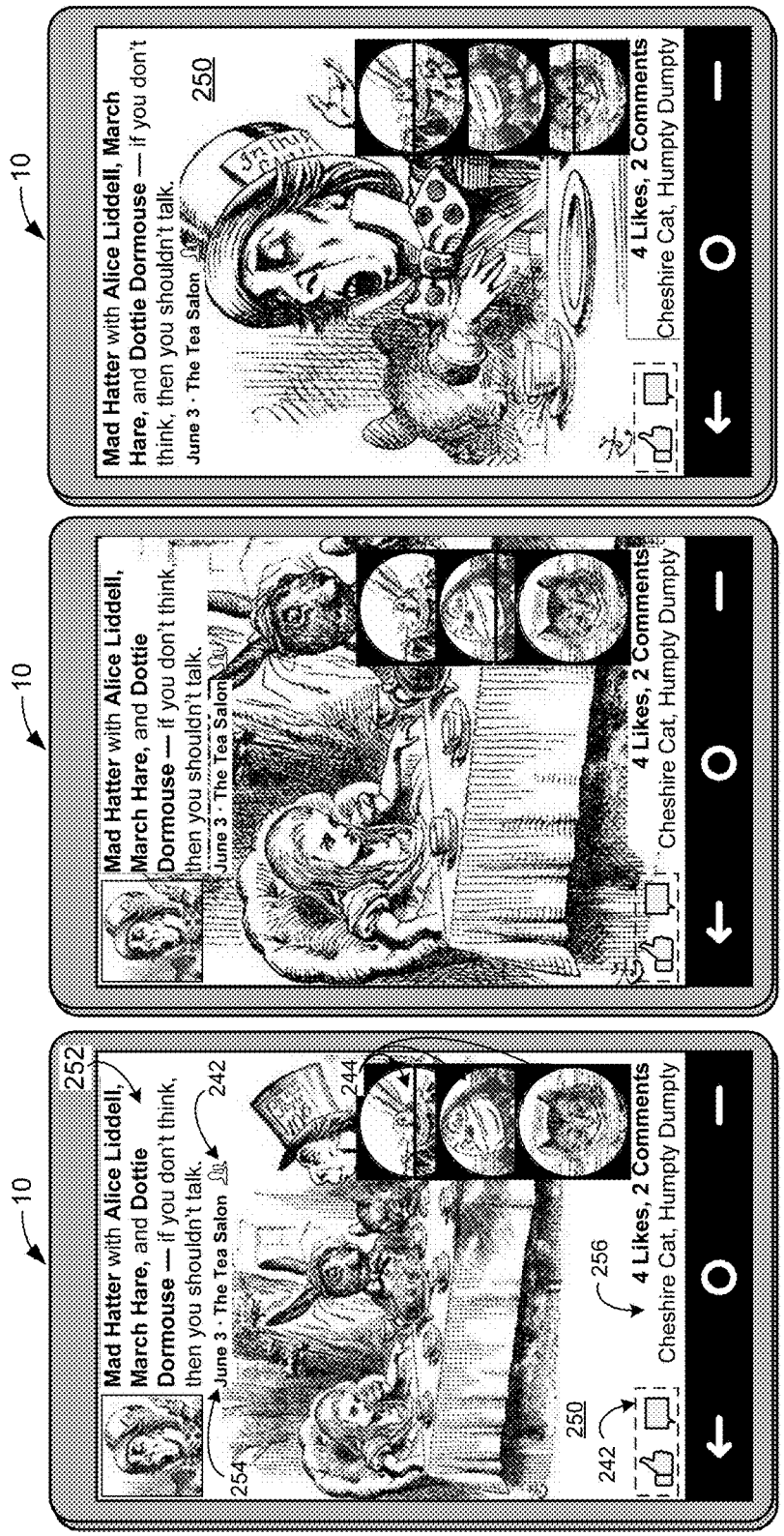
FIGS. 2C-2E illustrate examples of the cover feed with social interaction features.

FIGS. 2C-2E illustrate examples of the cover feed 250 with social interaction features. As shown in FIGS. 2C-2E, cover feed 250 comprises a content board displaying content posted by a social connection of user Alice (i.e., Mad Hatter) and related information, as well as social interaction features (i.e., content-related social-networking interactive elements 242 and user-related social-networking interactive elements 244). In FIGS. 2C-2D, the content board includes text that was posted together with a background image of a tea party posted by social-networking user Mad Hatter, whereas in FIG. 2E, the posted text is not associated with any particular image (e.g., a text-only status update, or a micro-blogging post), and so another picture, such as the profile picture of the user who posted the text (i.e., user Mad Hatter) may be displayed as the background image of the content board instead. The background image included in the content board may be displayed initially so as to fit the entirety of the image (as shown in FIG. 2C) or somewhat zoomed in (as shown in FIG. 2D). In particular embodiments, the user may be able to zoom in and/or out of the background image. Cover feed 250 may also comprise a caption 252 that includes information identifying social-networking users that have been tagged in the image of the tea party, date and location information 254 associated with the posting, and status information 256 indicating how many social-networking users have "liked" the image or commented on the image of the tea party and identifying a few of those users.

Figure 2F:
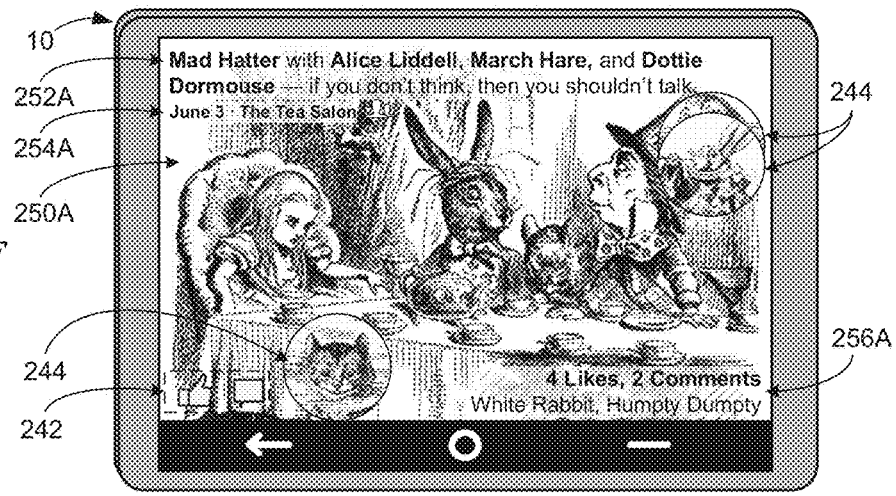
FIGS. 2F-2H illustrate transitions between content boards of the cover feed.
Figure 2G:
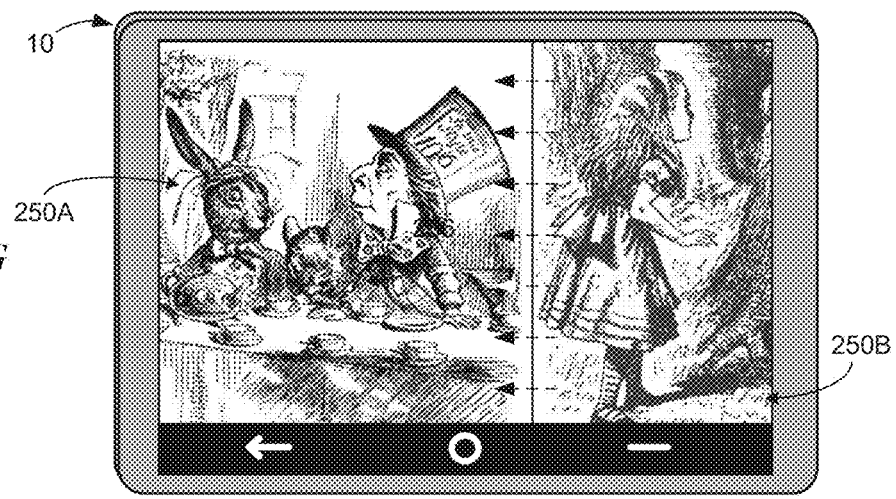
Figure 2H:
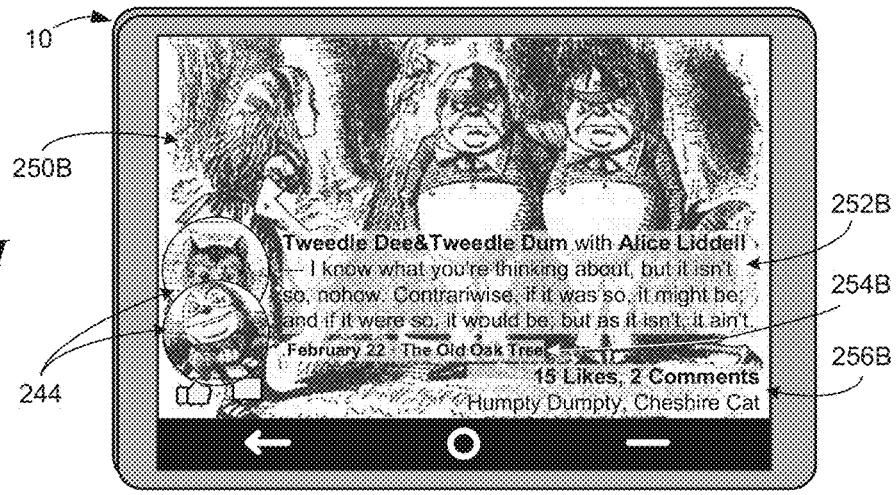

FIGS. 2F-2H illustrate transitions between content boards of cover feed 250. As shown in FIG. 2F, content board 250A of cover feed 250 includes the content posted by Mad Hatter, including caption 252A, date and location information 254A, and status information 256A. FIG. 2G illustrates an example scrolling transition, as content board 250A scrolls to the left side off the screen and content board 250B scrolls from the right side onto the screen; in particular embodiments, other types of conventional transition between two images displayed on a screen may be provided (e.g., dissolve, spin in/out, bouncing around, scrolling up/down or left/right, shattering), including a variety thereof. In particular embodiments, transitions may occur in manual mode, such as, for example, upon detecting a gesture (e.g., swipe) or some other type of user input (e.g., click, shake, flick), and/or in automatic mode (e.g., periodically at predetermined intervals). In particular embodiments, mobile computing device 10 may switch between manual and automatic transition mode upon detecting a change in the state of mobile computing device 10 (e.g., from being in manual mode while held in the user's hand, device 10 then switches into automatic mode when it is set down onto a flat horizontal surface, placed on a stand, plugged in for charging, or the lock screen is activated). In particular embodiments, when mobile computing device 10 is in automatic transition mode, mobile computing device 10 may pause the automatic transitions upon detecting that the user is no longer viewing the screen (e.g., upon detecting, using a proximity sensor, that the user has placed mobile computing device 10 next to their head while answering a phone, covered the screen with their hand, or placed mobile computing device 10 into an enclosure, such as a case or bag; upon detecting, using a gyroscope, that the user has dropped mobile computing device 10 or flipped mobile computing device 10 to be screen side down on a surface; upon detecting that the screen has been turned off or that mobile computing device 10 has been placed into silent/vibrate mode; upon detecting, using eye-tracking sensors, that the user has looked away from the screen); or upon detecting that the user is engaged in using one of the social interaction features (e.g., while the user is in the middle of typing a reply to a message from another user).

FIGS. 2J-2K illustrate an example app launcher feature of the socialized dash. As illustrated in FIG. 2J, control bauble 220 (also shown in FIGS. 2A and 2L) may be used as a shortcut to access particular functionalities (e.g., the app launcher shown in FIG. 2K, or the chat interface shown in FIG. 2M). In particular embodiments, these particular functionalities may be accessible from a lock screen displayed on the device. In the example shown in FIGS. 2A and 2J, after the user clicks on, touches a finger on, or hovers over control bauble 220 as shown in FIG. 2A, different functionality options appear, as shown in FIG. 2J. In the example shown in FIG. 2J, three functionality options are provided: an icon 222 to access the chat interface shown in FIG. 2M, an icon 224 to access the app launcher shown in FIG. 2K, or an icon 226 to return to the most recently-used application. In particular embodiments, more or fewer than three functionality options may be presented; in particular embodiments, the number of functionality options presented, the selection of which functionality options to present, and/or the icon images associated with particular functionality options may be configured by the user—for example, icon 224 may be re-assigned to present an interface to post content to a social-networking site. In particular embodiments, posting to the social-networking system may include functionality such as for example, uploading a photograph or video, checking in at a location, updating a status of the user, or uploading a comment on content that was posted on the social-networking system by a social connection (i.e., "friend").

In the example illustrated in FIG. 2J, after functionality options 222, 224, and 226 appear, control bauble may then be used to select a particular functionality option—for example, if the user placed their finger onto control bauble 220 to cause functionality options 222, 224, and 226 to appear, the user may then drag control bauble 220 onto a particular functionality option (e.g., onto icon 224, as shown in FIG. 2J) in order to select it. In particular embodiments, such as where clicking on or tapping control bauble 220 caused functionality options 222, 224, and 226 to appear, the user may only need to click on or tap a particular functionality option in order to select it.

FIG. 2K illustrates an example app launcher where icons 260 to access different applications are displayed. The app launcher may also include an icon 262 to post content on a social-networking system related to a status update, an icon 264 to access a camera of mobile computing device 10 or to access a photo album or gallery, and an icon 266 to easily "check in" the user on a social-networking system by posting content including the user's location. As shown in FIG. 2K, an app launcher with multiple screens for icons may further display a page indicator 268. The app launcher interface may appear as an overlay on top of cover feed 250, as shown in FIG. 2K. In particular embodiments, the app launcher interface may include all applications installed on mobile computing device 10, or it may only include the most-frequently-used application, or it may include applications selected for inclusion by the user.

FIGS. 2L-2M illustrate an example chat feature of the socialized dash. In the example illustrated in FIG. 2L, after functionality options 222, 224, and 226 appear, control bauble is then used to select the functionality option represented by icon 222 (chat interface). The chat interface may appear as an overlay on top of cover feed 250, as shown in FIG. 2M. The example chat interface illustrated in FIG. 2M includes a number of user-related social-networking interactive elements 244, each of which may have a flag notifying the user (Alice) that unread messages are waiting and how many of those exist for the user identified by each user-related social-networking interactive element 244. The example chat interface illustrated in FIG. 2M also includes chat messages 270, images 272 to identify the chat participant chatting with the user of mobile computing device 10, and a chat input area 274.

Figure 2N:
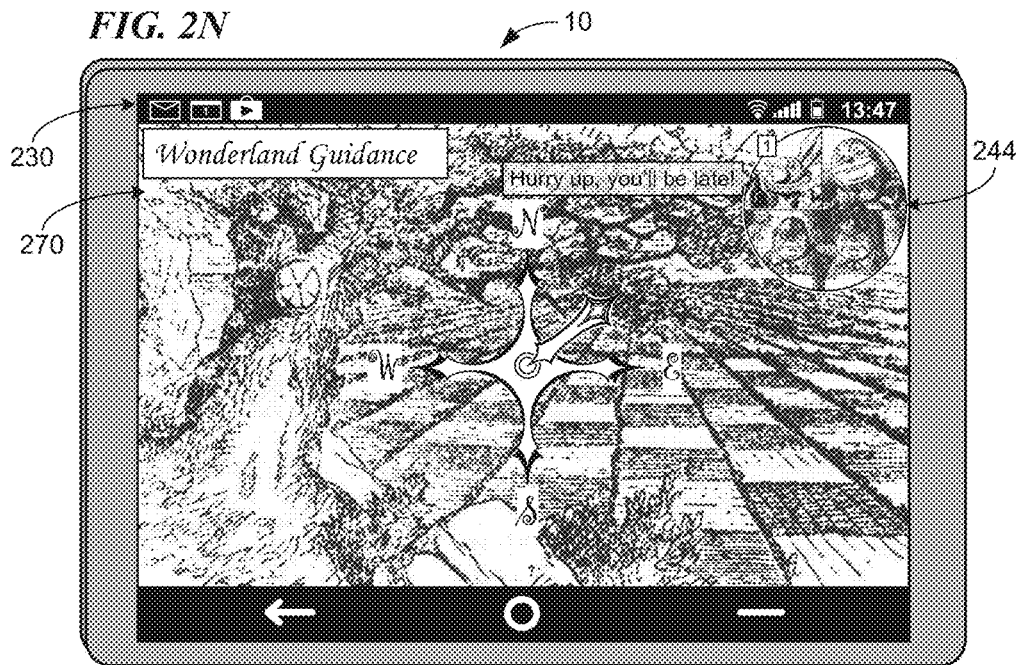
FIGS. 2N and 2P illustrate an example overlay of social interaction features on top of a mobile application
Figure 2P:
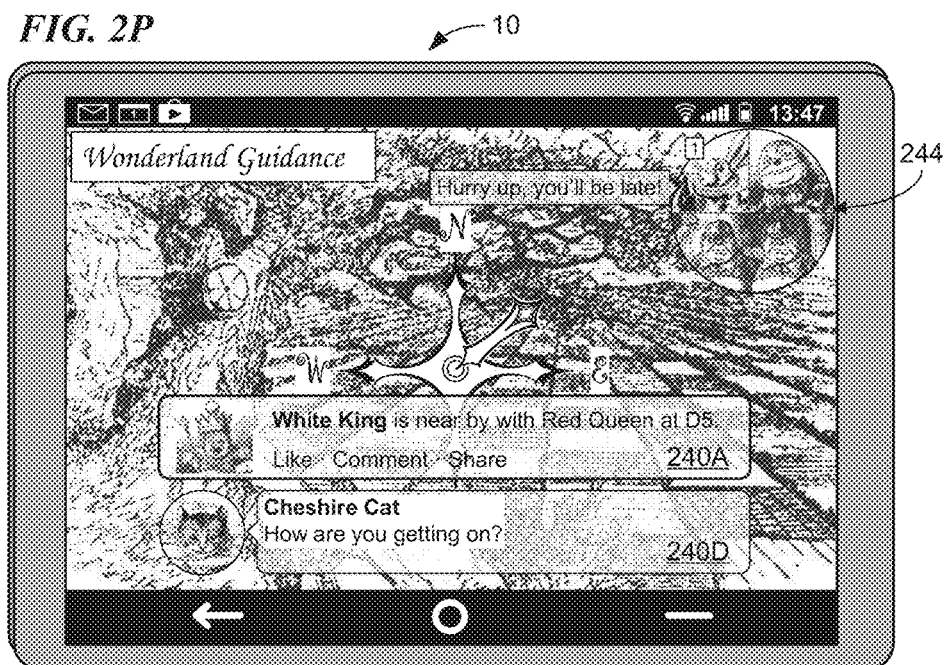

FIGS. 2N and 2P illustrate an example overlay of social interaction features on top of a mobile application. As shown in FIGS. 2N and 2P, user-related social-networking interactive element 244 may appear as an overlay over any other application running on mobile computing device 10 (in the example application illustrated in FIGS. 2N and 2P, a compass application). As also shown in FIGS. 2N and 2P, user-related social-networking interactive element 244 may identify more than one user and present one or more social-networking functionalities related to one or more of the identified users. In particular embodiments, different sets of functionalities may be provided for different identified users. As shown in FIG. 2P, notifications and/or feed items 240A and 240D (from FIG. 2B) may also appear as an overlay over the application. In particular embodiments, if an underlying application involves, relates to, or otherwise identifies one or more users, user-related social-networking interactive element 244 may select and identify those users for inclusion and availability through user-related social-networking interactive element 244.

As described above, the socialized dash may provide social interaction features, such as, for example, one or more content-related social-networking interactive elements 242 that correspond to one or more social-networking functions that may be performed in relation to the particular content board being displayed in cover feed 250 and/or one or more user-related social-networking interactive elements 244 that correspond to one or more social-networking functions that are related to one or more particular social-networking users (and may or may not be related to any particular content board(s)). In particular embodiments, a user-related social-networking interactive element 244 associated with a particular user may also be displayed with a particular content board where the particular content board has some relation to the associated user (e.g., content presented in the content board involves, relates to, or otherwise identifies the user).

As an example and not by way of limitation, content-board-related social-networking interactive elements 242 may correspond to social-networking functionalities, such as for example, a friend feature (related to social-networking users tagged/identified in the content board), a "Like" feature (to "like" the content board), or a comment feature (to comment on the content board), as illustrated in the example wireframes of FIGS. 2C-2F and 2H. In particular embodiments, the friend feature of the social-networking system may include functionality such as for example, sending friend requests to users, responding to friend requests from users, searching for users on the social-networking system, or accessing user profiles of users on the social-networking system. Herein, the term "friend" may refer to any other user of a social-networking system with whom the user associated with mobile computing device 10 has formed a connection, association, or relationship via the social-networking system.

User-related social-networking interactive elements 244 may provide one or more social-networking functionalities related to one or more identified users. For example, as shown in FIGS. 2C-2F and 2H, each user-related social-networking interactive element 244 (shown as a "chat bauble") may identify and provide functionalities related to only one user, or, as shown in FIGS. 2L-2M, a plurality of social-networking users. The identified user(s) may or may not be social-networking connections of the owner of mobile computing device 10 (i.e., Alice).

In particular embodiments, a messaging functionality of user-related social-networking interactive element 244 may include, for example, displaying the most recent message sent by the identified user, writing a message to the identified user, replying to a message from the identified user, viewing the number of unread messages from the identified user, changing messaging permissions with respect to the identified user, declining and/or deleting messages from the identified user, updating attributes associated with the user's relationship to the identified user (e.g., labeling the relationship as "Soccer Teammate" and/or categorizing the relationship as "Married To"), sending/accepting/refusing a social-networking invitation to connect to the identified user, viewing profile information for the identified user, or deleting the identified user from the user's social graph. Other functionalities may be attached to a user-related social-networking interactive element 244 associated with an identified user, such as location-related functionalities (e.g., locate the identified user's current location on a map, or map directions to the user's address), calendar-related functionalities (e.g., bring up one or more events for which the identified user is the sender/recipient, or display the identified user's RSVP status), or any other type of user-related social-networking functionality (e.g., showing a score or status in relation to a social-networking game or application).

User-related social-networking interactive elements 244 may appear as an overlay over cover feed 250, as shown in FIGS. 2C-2F and 2H, as an overlay over one or more applications executing on mobile computing device 10, as shown in FIGS. 2L-2M, or as an overlay over any other appropriate user interface presented on mobile computing device 10.

In particular embodiments, the user of mobile computing device 10 may interact with the social-networking system through social interaction features 242 and 244 without launching an application associated with the social-networking system or using a web browser. As an example and not by way of limitation, the user of mobile computing device 10 may write a message to another user of the social-networking system by tapping on a particular user-related social-networking interactive element 244 of the socialized dash. In particular embodiments, the message from the user of mobile computing device 10 written using social-networking interactive element 244 may be sent to the social-networking system in real-time using a communication protocol, as described above. Although this disclosure illustrates and describes a socialized dash with social interaction features corresponding to particular functionalities of particular computing systems, this disclosure contemplates a socialized dash with any suitable interactive elements corresponding to any suitable functionality of any suitable computing system, such as for example, one or more social-networking or third-party system.

In particular embodiments, the user of mobile computing device 10 may interact with the social-networking system through social interaction features 242 and/or 244 and/or notifications and/or feed items 240 directly from the socialized dash without launching or executing an application. As an example and not by way of limitation, the user of mobile computing device 10 may comment on or "like" a status update on the social-networking system through a social-networking interactive element 242 without launching an application associated with the social-networking system. In particular embodiments, the notifications and/or feed items 240 may include options that enable the user of mobile device 10 to interact with the incoming messages. As an example and not by way of limitation, if the incoming message is a notification of a SMS message, there may be options corresponding to actions such as for example "reply", "forward", or "delete", from which the user of mobile device may select a particular action to perform in response to the SMS message, where the particular action may cause another application to be launched (e.g., a SMS application). As another example, if the incoming message is a newsfeed item that includes a photo, the user may cause the photo to expand to cover most or all of the display area through a pre-determined touch gesture, and then perform social-network interactions related to the photo, such as for example, comment, like, share, etc.

As another example, a persistent UI or socialized dash may be provided for display on mobile computing device 10 in response to a user actuating a "home" button 212, after using or closing an application executed on mobile computing device 10, after completing a telephone call on mobile computing device 10, or in response to any suitable action. In particular embodiments, the socialized dash may be accessed at any time, including during interaction with an application, by performing a pre-determined gesture detected through touch sensor 12. As an example and not by way of limitation, the user may access the socialized dash by tapping and holding the top of the display area and pulling down the socialized dash, thereby revealing the social-networking interactive elements and incoming messages of socialized dash, described below. Although this disclosure illustrates and describes a particular type of computing device, this disclosure contemplates a socialized dash implemented on any suitable type of computing device, such as for example, a personal computer, tablet computer, connected television, or a smartphone.

In particular embodiments, the socialized dash may function as an application launcher, be integrated with, or work in conjunction with an application launcher. In the example of FIG. 2J-2K, the application launcher of the socialized dash may include one or more application interactive elements 250, such as for example icons, that each correspond to an application installed on or a function of mobile computing device 10. As an example and not by way of limitation, an application or function of mobile computing device 10 may be executed or "launched" in response to detecting a pre-determined touch gesture, such as for example, tapping an application icon 250 as illustrated in FIG. 2K.

In particular embodiments, the application launcher functionality of the socialized dash may be accessed by performing a pre-determined touch gesture, such as for example, tension scrolling of the socialized dash. As an example and not by way of limitation, tension scrolling may comprise performing a touch gesture to scroll up through the notifications and/or newsfeed items (e.g., as shown in FIG. 2B) and continuing to scroll upwards past the notifications and/or newsfeed items. As another example, the socialized dash may be "pulled down" (e.g., by tapping and holding the top of the socialized dash and pulling it down, thereby revealing application interactive elements 56 underneath the socialized dash. Furthermore, the socialized dash may occupy, such as for example, the bottom 5% of the screen, such that the user may interact with other applications, etc. The user may drag socialized dash back to its original position, thereby covering substantially the entire screen. As described above, the socialized dash may function as a lock screen when mobile computing device 10 is in a locked mode. In particular embodiments, mobile computing device 10 may be released from the locked mode in response to performing a pre-determined touch input, such as for example tension scrolling, detected by the touch sensor of mobile device 10. In particular embodiments, releasing mobile computing device 10 from the locked mode may allow interactions with mobile computing device 10. As an example and not by way of limitation, releasing mobile computing device 10 from the locked mode may access the launcher functionality of the socialized dash, as illustrated in FIG. 2C. In particular embodiments, if mobile computing device 10 is secured with a personal identification number (PIN) lock, mobile computing device 10 may transition from the socialized dash to a PIN screen for the user to provide the PIN to release mobile computing device 10 from the locked mode.

Figure 3:
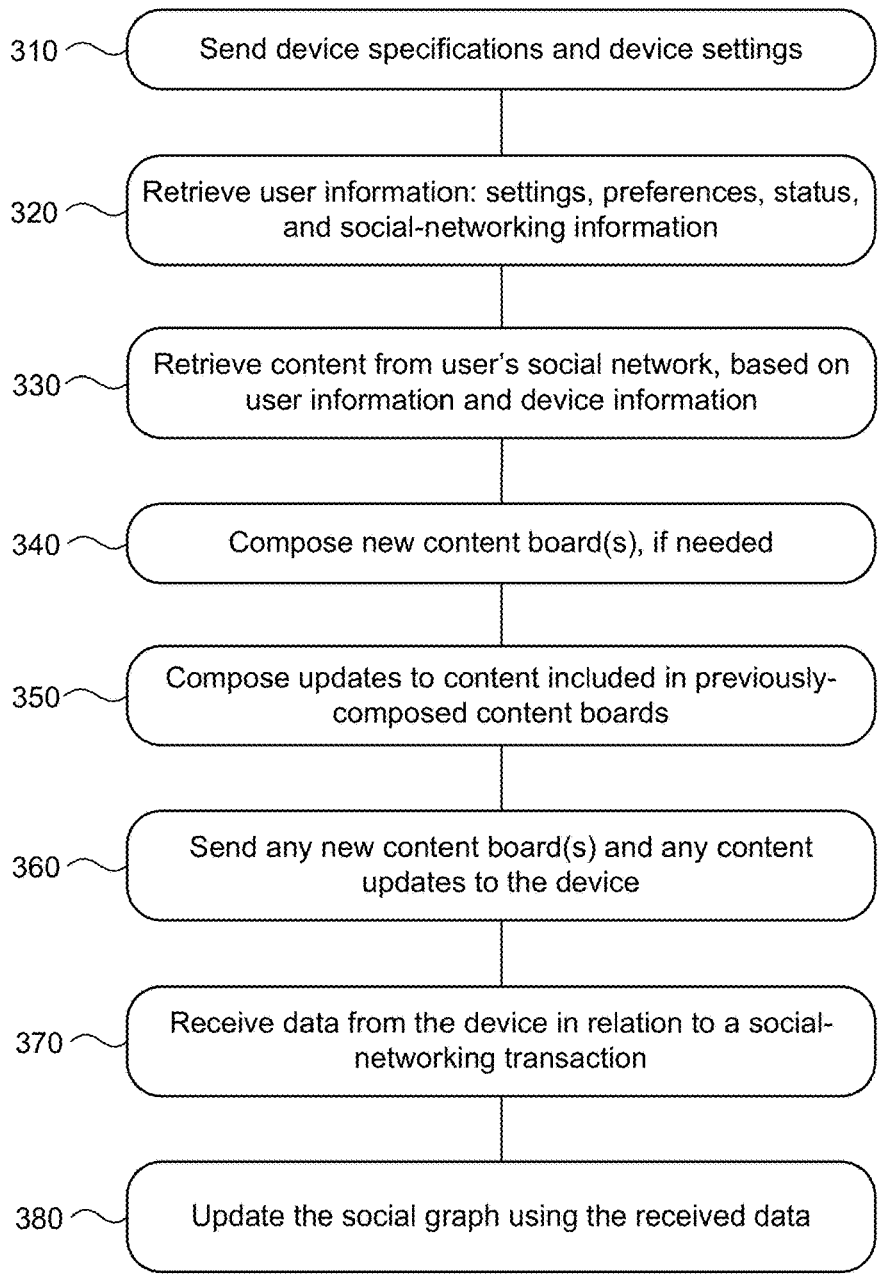
FIG. 3 is a flowchart of steps in an example method for providing a socialized dash with a cover feed.

FIG. 3 is a flowchart of steps in an example method for providing a socialized dash with a cover feed. As described above, the socialized dash is designed to present the user with an interface that integrates social-networking content and social-networking functionality throughout the user interface presented by the operating system of mobile computing device 10 (and possibly completely overlaying or visually obscuring it).

In step 310, specifications and settings for mobile computing device 10 are provided to the social-networking system. The device specifications and settings may be stored in the social-networking user's profile. In particular embodiments, the device specifications and settings may be provided automatically by mobile computing device 10 (e.g., after the user logs in to the device using their social-networking user identifier and password), manually (e.g., by the user typing in a device identifier when logged in to the social-networking website), or automatically by a third-party source (e.g., network service provider, device retailer). Once the social-networking system is aware of the device specifications and settings, it may be able to pre-configure particular aspects of the socialized dash and/or cover feed 250 for the capabilities and/or restrictions of the device (e.g., does the device have a touchscreen? is the device able to detect touch gestures/three-dimensional gestures above the screen? is the device able to track eye movement? is the device's screen able to display high-resolution images/three-dimensional images/holographic images?).

In step 320, in preparation to send information to mobile computing device 10 in order to present a socialized dash including a cover feed, the social-networking server may retrieve user information, such as settings and preferences configured by the user with respect to their social-networking account (e.g., only display content in the cover feed that is associated with first-degree connections), user status (e.g., "Do Not Disturb" status that indicates that notifications should be suppressed), and/or social-networking information (e.g., social graph information, content recently posted by social connections).

In step 330, the social-networking system may retrieve content from the user's social network, based on the user information and the device information. Such content may include any type of content, including metadata and other information associated with the content. In particular embodiments, the content may include, for example, content posted or provided by the user, by the user's social connections, by users or entities that the user is following or affiliated with, or by third parties (e.g., sponsored stories or advertisements). In particular embodiments, if the retrieved content does not include an image suitable for use as a background image on mobile computing device 10 (e.g., a text-only posting, or incompatible image type), the social-networking website may retrieve an image that is associated with the retrieved content (e.g., the user profile image of the social connection who posted the content) for use as the background image. In particular embodiments, the social-networking system may prioritize, restrict, and/or otherwise control retrieval of content (e.g., when there is a plethora of available content because the user has a copious number of social connections who diligently and frequently post content) based on any number of factors, by way of example and not limitation: degree of separation (with respect to the user who posted the content, user(s) directly identified in the content, or user(s) associated with the content by a tag), affinity, relevance, recency, popularity (as determined by, e.g., views, clicks, "Likes", comments, ratings, re-postings), proximity (for content associated with a particular location, with respect to the user's current location, the user's "home" location, or another location associated with the user), privacy settings of other users identified in or associated with the content, or whether the content is sponsored or not.

In step 340, the social-networking system may compose new content boards, if needed. Composing a new content board may comprise utilizing content retrieved in step 330 (e.g., image and accompanying text posted by a social connection plus metadata associated with the posted content, such as time, date, location, user-identifying tags, plus related social-networking information, such as content posted in response to the posted content, statistics indicating approval/disapproval/popularity/re-distribution/downloads of the posted content, and content including or referencing the posted content, e.g., mashups). In particular embodiments, composition of a content board may include modification of the content to adapt the content to mobile computing device 10 (e.g., modifying the image size, resolution, aspect ratio, colors, file size), modification of the content to adapt the content to the user's preferences and/or settings (e.g., displaying/hiding particular statistics and/or metadata associated with the content, providing a user-related social-networking interactive element 244 for each user identified in or associated with the content, redacting particular words), modification of the content to adapt the content according to the privacy settings of other users identified in or associated with the content (e.g., hiding identification information for the other users, removing contact information and/or functionality for the other users, restricting any content-related social-networking interactive elements 242 from being displayed in order to prevent comments by the user).

In step 350, the social-networking system may compose updates to content included in previously-composed content boards. For example, if the number of "Likes" has changed, or if additional comments in response to the content have been posted, or if addition tags identifying other users have been added, then the social-networking system may compose an update for the content in the relevant previously-composed content board with any such modified or added information. In particular embodiments, if the content in the previously-composed content boards was provided by a content posting that has since been deleted, the social-networking system may compose an update either instructing mobile computing device 10 to delete the content board or indicating that a message should be displayed to inform the user that the content has been removed by the original poster of the content.

In step 360, the social-networking system may send any new content board(s) and any content updates to the device. In particular embodiments, the social-networking system may send such new content and updates when one or more conditions are present: receipt of a request from mobile computing device 10 for new content (e.g., when the number of "fresh" (new or as-of-yet-un-displayed) content boards locally cached on mobile computing device 10 drops below a particular threshold), receipt of an event notification from mobile computing device 10 (e.g., when mobile computing device 10 is turned on, acquires a Wi-Fi network connection, or connects to a network providing unlimited data access), or at periodic intervals. Any such periodic interval may vary based on a number of factors, such as configuration settings to limit data usage or specify image quality, device display attributes (e.g., resolution and pixel density), viewing history, device usage patterns, device sensor input, battery level, network connectivity, bandwidth availability.

In step 370, the social-networking system may receive data from the device indicating a social-networking transaction entered on the device by the user, using the socialized dash. For example, if the user responded to a content board, using a content-related social-networking interactive element 242, in order to "Like" the content, submit a comment on the content, or send a friend request to a user tagged in association with the content, the social-networking system may receive data sent by mobile computing device 10.

In step 380, the social-networking system may update the social graph using the received data and/or send notifications to other social-networking users based on the received data.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIGS. 4A-4F illustrate states of an example queue of content boards for a cover feed during operation of an example content board ordering algorithm. In particular embodiments, the social-networking system may determine a ranking of content associated with the content boards in the cover feed. In particular embodiments, the social-networking system may determine an order for display of the content boards in the cover feed (which may be based at least in part on the ranking of content) so as to ensure that the "freshest" and most interesting content is promoted in the queue of content boards for display to the user. In particular embodiments, a change in content ranking may (or may not) result in a change in the order for display of the content boards in the cover feed. In particular embodiments, the content board ordering algorithm may be applied to social-networking content and other information to continually determine and update an order for the content boards based on which content items have already been viewed by the user, any factor described above (e.g., popularity, relevance, social graph connections, affinity, etc.), or any social-networking information discussed above. For example, once the user has viewed particular content, the order of the content boards may be updated, so that fresh content is promoted in the queue ahead of previously-viewed content. In another example, as content in a previously-downloaded content board rises in popularity (e.g., by being "Liked" and/or commented on by users of the social-networking system), the order of the content boards may be updated to move the content board forward in the queue, in order to promote more popular content in the queue ahead of less-popular content. In another example, if content in a previously-downloaded content board is subsequently tagged as identifying a social connection of the user, the order of the content boards may be updated to move the content board forward in the queue, in order to promote more relevant content. In particular embodiments, information about a user's activities on third-party sites and/or other applications may be a factor for ranking, e.g., the ranking may be downgraded if the user has viewed the particular content on a third-party content site or in another application on their device, or the ranking may be upgraded if the user has subscribed to a particular content channel on a third-party site or in another application on their device that is related to the particular content.

In particular embodiments, content may be continually ranked and re-ordered; in some embodiments, content may be ranked and re-ordered periodically (e.g., once per session, or once each time the screen is turned off or on). In particular embodiments, updates to the order of the content boards may be continually and/or periodically sent to mobile computing device 10.

For the purpose of illustrating operation of the example content board ordering algorithm as applied to the example queue of content boards shown in FIGS. 4A-4F, a white star in the upper-right hand corner of a content board indicates that the content board has not yet been displayed, a dark star in the upper-right hand corner of a content board indicates that the content board has been displayed, a dark star inside of a circle in the upper-right hand corner of a content board indicates that the content board is currently available for display on a screen of mobile computing device 10, and a pushpin in the upper-left hand corner of a content board indicates that the content board has been "pinned" to the front of the queue for the cover feed. A content board that is currently available for display may be currently displayed on the screen of mobile computing device 10, may be the next content board that is up for display once the screen of mobile computing device 10 is turned on, or may be the next content board that is up for display once the cover feed is active on mobile computing device 10.

Figure 4A:
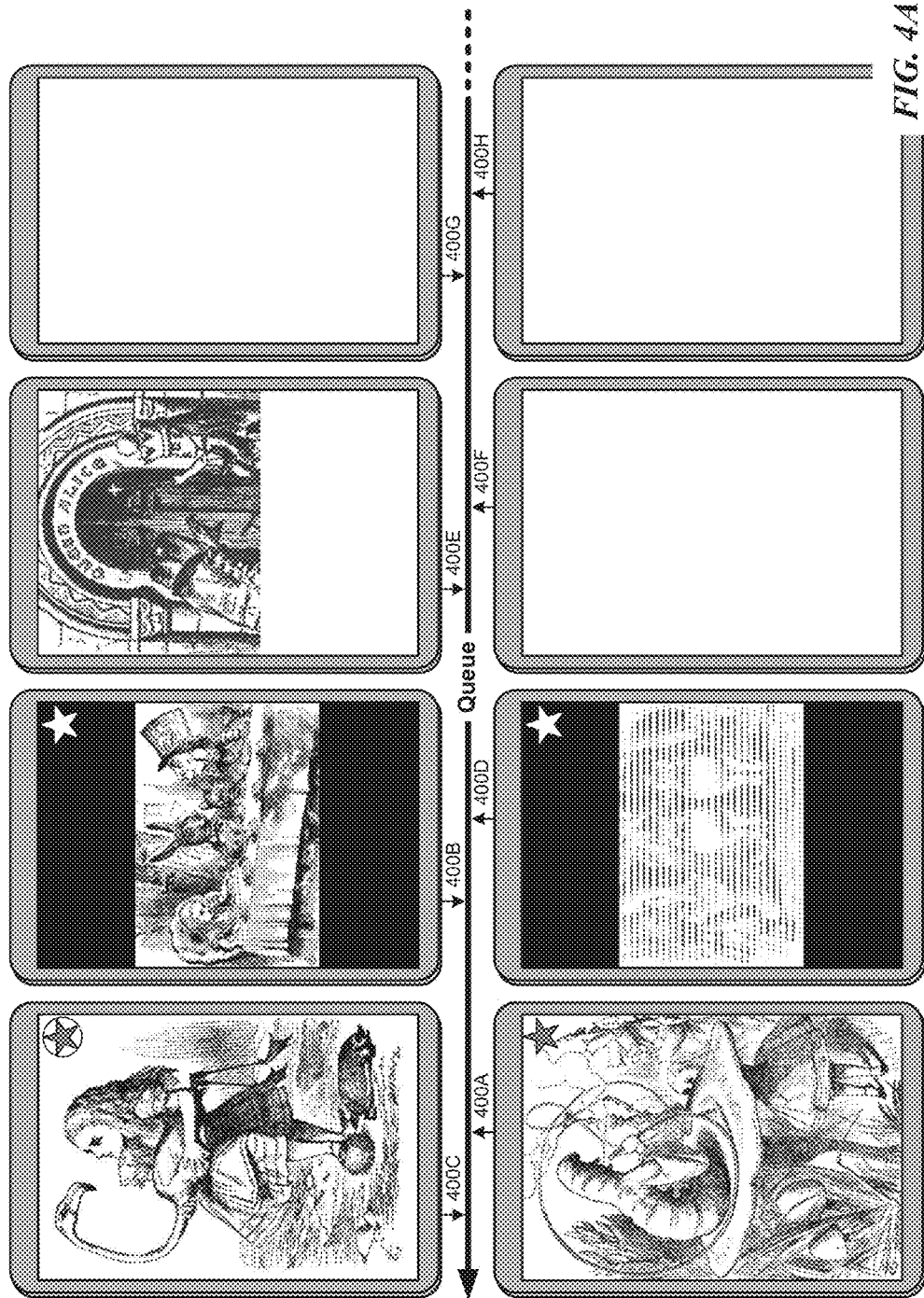

In FIG. 4A, content board 400C is currently available for display on mobile computing device 10. Content board 400C was promoted after content board 400A was displayed on the device, and then subsequently pushed back in the queue after the cover feed transitioned from content board 400A to content board 400C. Content board 400A was previously ranked ahead of content board 400C based on one or more factors considered by the content board ordering algorithm (e.g., more popular, more relevant since a social connection is depicted, more recently posted to the social-networking system). Since device status information indicates that the device is currently being held in portrait orientation, any content boards with images in portrait orientation are promoted in the queue ahead of any content boards with images in landscape orientation; therefore, although content board 400A has already been displayed, the content board ordering algorithm promotes content board 400A ahead of content boards 400B and 400D. Content board 400B is ranked ahead of content board 400D based on one or more factors considered by the content board ordering algorithm. Content boards 400E, 400F, 400G, and 400H include content elements that have not yet been completely downloaded, so they have been demoted to the back of the queue.

In FIG. 4B, content board 400E (having been completely downloaded to mobile computing device 10) is currently available for display on mobile computing device 10. Content board 400C was pushed back in the queue after the cover feed transitioned from content board 400C to content board 400E. Since the device is currently being held in portrait orientation, any content boards with images in portrait orientation are promoted in the queue ahead of any content boards with images in landscape orientation; therefore, although content board 400E was originally ranked behind content boards 400B and 400D, the content board ordering algorithm promotes content board 400E for display ahead of content boards 400B and 400D (which also remain behind content boards 400A and 400C in the queue. Content boards 400F, 400G, and 400H include content elements that have not yet been completely downloaded, so they remain at the back of the queue.

In FIG. 4C, device status information indicates that the device is now being held in landscape orientation, so content boards 400B and 400D have been promoted to the front of the queue, and content board 400B is currently available for display on mobile computing device 10. Content board 400E was pushed back in the queue (behind previously-displayed content boards 400A, 400C, and 400E) after the cover feed transitioned from content board 400E to content board 400B. Content board 400F (having been completely downloaded and not yet displayed) is now the first portrait orientation content board appearing in the queue (ahead of all previously-displayed content boards having portrait orientation—content boards 400A, 400C, and 400E). Content boards 400G and 400H include content elements that have not yet been completely downloaded, so they remain at the back of the queue.

Figure 4D:

In FIG. 4D, content board 400A has been "pinned" to the front of the queue, so it now persists at the front of the queue (despite the fact that it is in portrait orientation). In particular embodiments, pinning a content board to the front of the queue may result in the pinned content board consistently appearing on the screen of mobile computing device 10 at particular designated moments (e.g., upon displaying a lock screen). In this example, mobile computing device transitioned to the next content board in the queue (400D) after the user unlocked the device. Content board 400B, having been displayed, is pushed back in the queue behind content board 400D. Since the device is still being held in landscape orientation, any content boards with images in portrait orientation are pushed back in the queue behind any content boards with images in landscape orientation. Content board 400G, which has completed being downloaded and has not yet been displayed, is now ranked ahead of content board 400F based on one or more factors considered by the content board ordering algorithm (e.g., since content included in content board 400G was more recently posted to the social-networking system and has surpassed the content included in content board 400F in terms of the number of "Likes" and comments since the last content board ordering). Content board 400H includes content elements that have not yet been completely downloaded, so it remains at the back of the queue.

In FIG. 4E, device status information indicates that the device is now being held in portrait orientation; however, the cover feed has also been reconfigured to rotate and zoom in on content boards having an orientation not corresponding to the current orientation of the device, so that orientation is no longer considered by the content board ordering algorithm. Content board 400A remains pinned at the front of the queue, and once past the lock screen, highly-popular content board 400G is made available for display on mobile computing device 10 (ahead of less-popular content board 400F). Content board 400H (having been completely downloaded and not yet displayed) now appears in the queue immediately behind content board 400F (and ahead of all previously-displayed content boards).

In particular embodiments, when a content board is zoomed in prior to display, the portion of the content board that is initially displayed in displayable region 200 may focus in on a region of the image that has been tagged as identifying the user, a social connection of the user, or some other item of significance. In the example content boards illustrated in FIGS. 4E and 4F, the zoomed-in content boards have been zoomed in so as to focus on a region of the image tagged as identifying user Alice.

In FIG. 4F, content board 400A is no longer "pinned" to the front of the queue, and content board 400F is now available for display on mobile computing device 10. Content board 400A is pushed back in the queue behind as-of-yet un-displayed content board 400H and further back behind already-displayed content board 400G, which is held in a queue position in front of all other already-displayed content boards (in this example, the cover feed interaction history indicates that user Alice showed a high level of interest in content board 400G by lingering on it, tagging herself in the image, "Liking" the content posting, and submitting a comment on the content posting for which she requested to be notified when any responses to her comment were posted). Already-viewed content boards 400A, 400C, 400E, 400B, and 400D follow content board 400G in the order in which they were originally displayed on mobile computing device 10.

Figure 5:
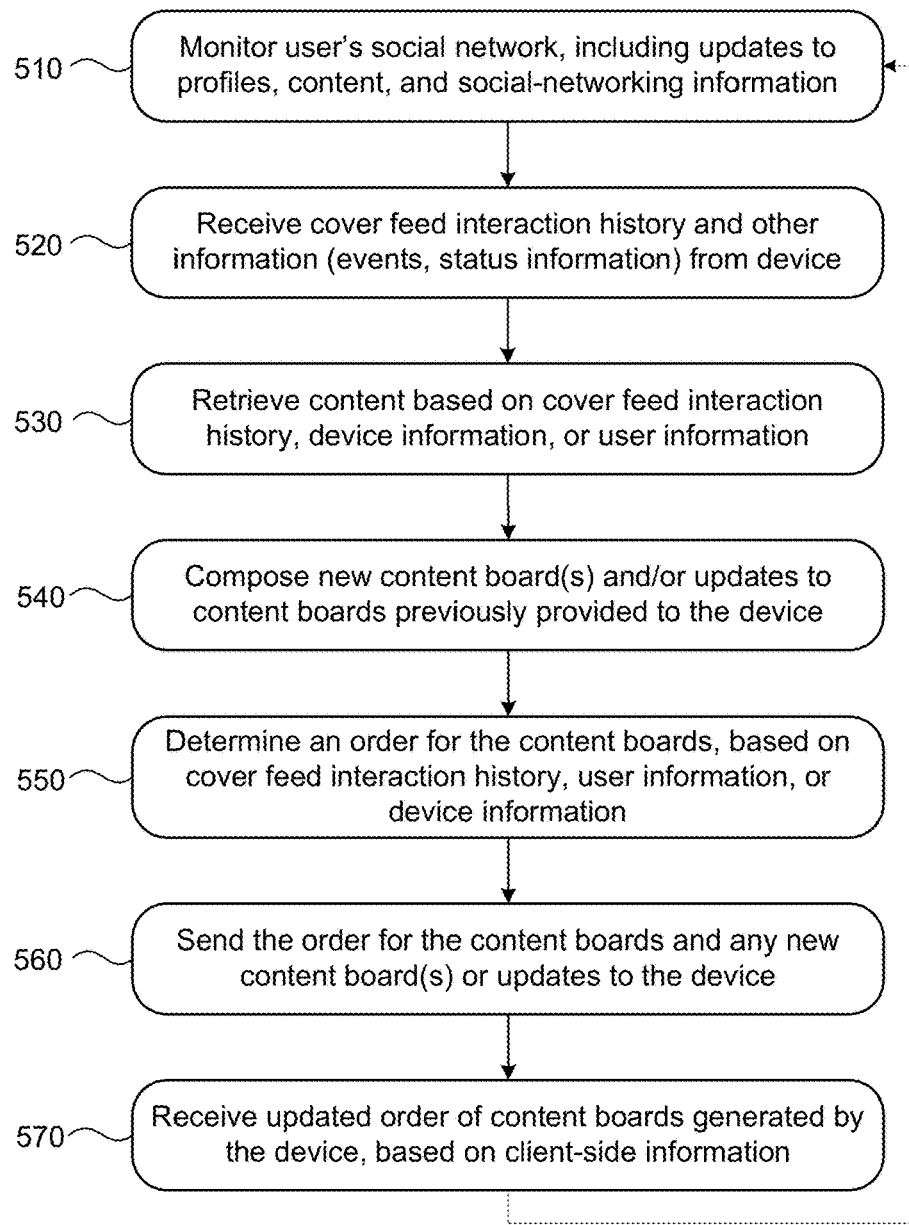
FIG. 5 is a flowchart of steps in an example method for ranking content boards in a cover feed.

FIG. 5 is a flowchart of steps in an example method for providing a socialized dash with a cover feed for mobile computing device 10. As described above, the socialized dash is designed to present the user with an interface that integrates social-networking content and social-networking functionality throughout the user interface presented by the operating system of mobile computing device 10 (and possibly completely overlaying or visually obscuring it).

In step 510, the social-networking system monitors the user's social network for newly-posted content, updates to previously-posted content and user profile information, events, messages, notifications, and other social-networking information.

In step 520, the social-networking system may receive a history (e.g., log) of cover feed interactions from mobile computing device 10. The cover feed interaction history may provide information regarding which content boards the user has viewed, which content boards still have content that is waiting for completion of download, what the current order is for the content boards, and possibly other information, such as, for example, how long the user viewed a particular content board, whether the user interacted with the content board (e.g., using a social interaction feature), whether the user skipped back to bring up a previously-viewed content board (e.g., by providing touch-screen gesture input), whether the user "bookmarked" a particular content board or "pinned" a particular content board as the "home" page or set a particular content board as the general device UI background or lock-screen UI background.

The social-networking server may also receive an event log of device-based events or notifications regarding device-based events (e.g., device turned on, device screen enabled, network connectivity established). In particular embodiments, such an event may constitute one of the designated opportunities to re-assess which content boards should be included in the cover feed and what the order of content boards should be. The social-networking server may also receive device status information (e.g., history log of recent device transactions (e.g., call/text/email/calendar invitation) involving social connections of the user, what type of network the device is currently connected to, how much network bandwidth is available to the device, battery level, available memory, etc.)

In step 530, the social-networking system may retrieve content from the user's social network, as previously described with respect to step 330 of FIG. 3, further based on the cover feed interaction history. In particular embodiments, the device information may also further include the received information about any device-based events and the device status information.

In particular embodiments, when the social-networking system prioritizes, restricts, and/or otherwise controls retrieval of content, additional factors for consideration may include, by way of example and not limitation: the cover feed interaction history (e.g., if the user has been "Liking" every cover board in which a particular social connection is tagged, look for content identifying or related to the social connection), device-based events (e.g., if the user has recently accepted an invitation sent by a particular social connection to play a game running on the device, look for content identifying or related to the social connection), or the device status information (e.g., if the device is currently plugged into a charging dock in a landscape orientation, look for content associated with images having a landscape orientation).

In step 540, the social-networking system may compose new content boards or updates to content included in previously-composed content boards, if needed. In particular embodiments, composition of a content board may include modification and/or restriction of content as previously discussed with respect to step 340, with the addition of possibly also modifying and/or restricting content based on the cover feed interaction history (e.g., if the user has been deleting or hiding every cover board in which a particular social connection is tagged, remove any content identifying or related to the social connection), device-based events (e.g., if the user has recently actively declined more than one phone call from a particular social connection, suppress any social interaction features identifying the social connection), or the device status information (e.g., if the device is currently plugged into a charging dock in a landscape orientation, rotate images to be in landscape orientation). In particular embodiments, the social-networking system may also consider service plan restrictions (e.g., when the user has reached or is nearing their monthly data transfer limit) when determining whether or not to compose additional new content boards and/or update previously-composed content boards (e.g., the social-networking system may simply compose small updates to content, such as updating the number of "likes" that particular content received, or sending an update with instructions to remove a content board containing content from a posting that has since been deleted.

In step 550, the social-networking system may then determine an order for the content boards in cover feed 250. The order may be based on the cover feed interaction history, the user information (including social-networking information related to the user), and/or the device information. As described with respect to FIGS. 4A-4F, the order may depend on any number of factors, including, by way of example and not limitation: the cover feed interaction history (e.g., in order to promote display of "fresh" content that has not yet been viewed, or to promote content associated with a particular location or social connection when the user has returned to similar content boards repeatedly), recency of the content as posted to the social-networking system, popularity of content in different content boards, relevance (to the user) of content in different content boards, or device-based events (e.g., if the user has recently been exchanging SMS messages/email/phone calls with a particular social connection, promote display of content identifying or related to the social connection). In particular embodiments, the social-networking system may also determine the order of the content boards based on the client-side considerations/factors discussed in step 590 (e.g., when mobile computing device 10 makes such information available to the social-networking system).

In step 560, the social-networking system may send the order for the content boards in cover feed 250 to mobile computing device 10. At this time, if there are any new content boards and/or updates to be sent to the device, such data may also be sent to the device.

In particular embodiments, the content board order assessment may occur in part at the server, which then pushes the content board order, any new content boards, and any updates to cached content boards out to the mobile device, and then in part at the mobile device, which may re-assess the content board order according to device-based information. A first phase of the content board order assessment may occur at the server, in order to uphold particular rules and/or principles that may be more easily assessed by the server, such as, for example: promoting content boards according to relevance to the user and/or popularity within a group of users. A second phase of the content board order assessment may occur at the mobile device, in order to uphold particular rules and/or principles that may be more easily assessed by the mobile device, such as, for example: promoting content boards for which all elements thereof have been completely downloaded and cached on the mobile device; and promoting content boards having background images whose orientation corresponds to the current orientation of the screen of the mobile device. Other rules and/or principles may include, for example: promoting content boards including content associated with a social connection of the mobile device owner, wherein the mobile device has recently received or sent a communication associated with the social connection; retaining cached content boards (and refraining from retrieving new content boards) when data transfer to and/or from the mobile device approaches a usage threshold; and/or the device's current status otherwise is not conducive to presentation of a particular content board (e.g., the background "image" is a link to a high-resolution video clip requiring more memory/processor capacity/battery power/network bandwidth than is currently available to the device). Also, as in step 530, in particular embodiments, the social-networking system may also consider service plan restrictions (e.g., when the user has reached or is nearing their monthly data transfer limit) when determining the order for the content boards.

In such situations, mobile computing device 10 may push back the position of the content board in the cover feed queue or simply delay presenting the content board to the user until all of the resources are (at least sufficiently) available (and then queue up the content board to be the next in line for display). The mobile computing device may also update the order of the content boards and send the updated order of the content boards back to the social-networking system (step 570).

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
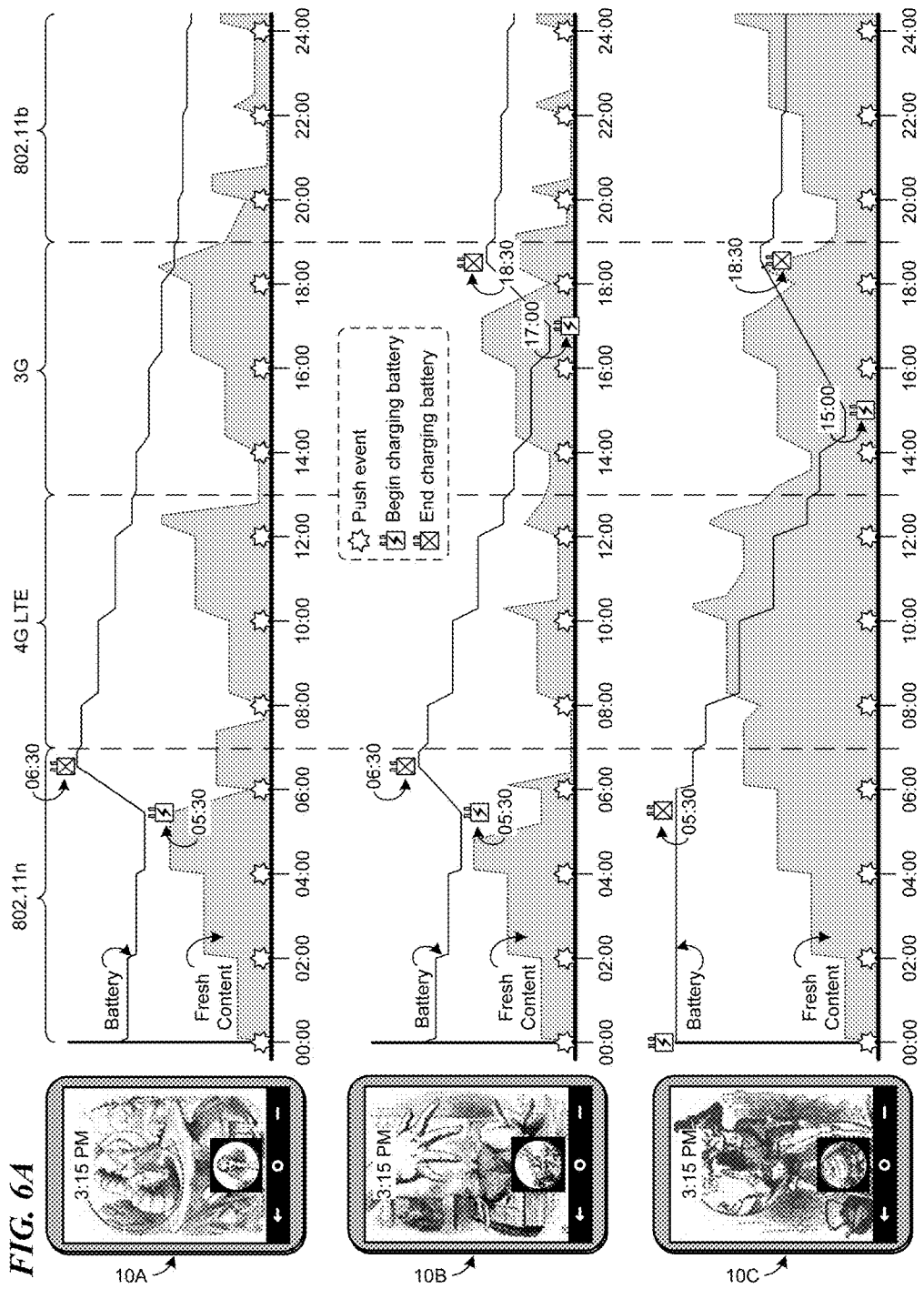
Figure 6C:
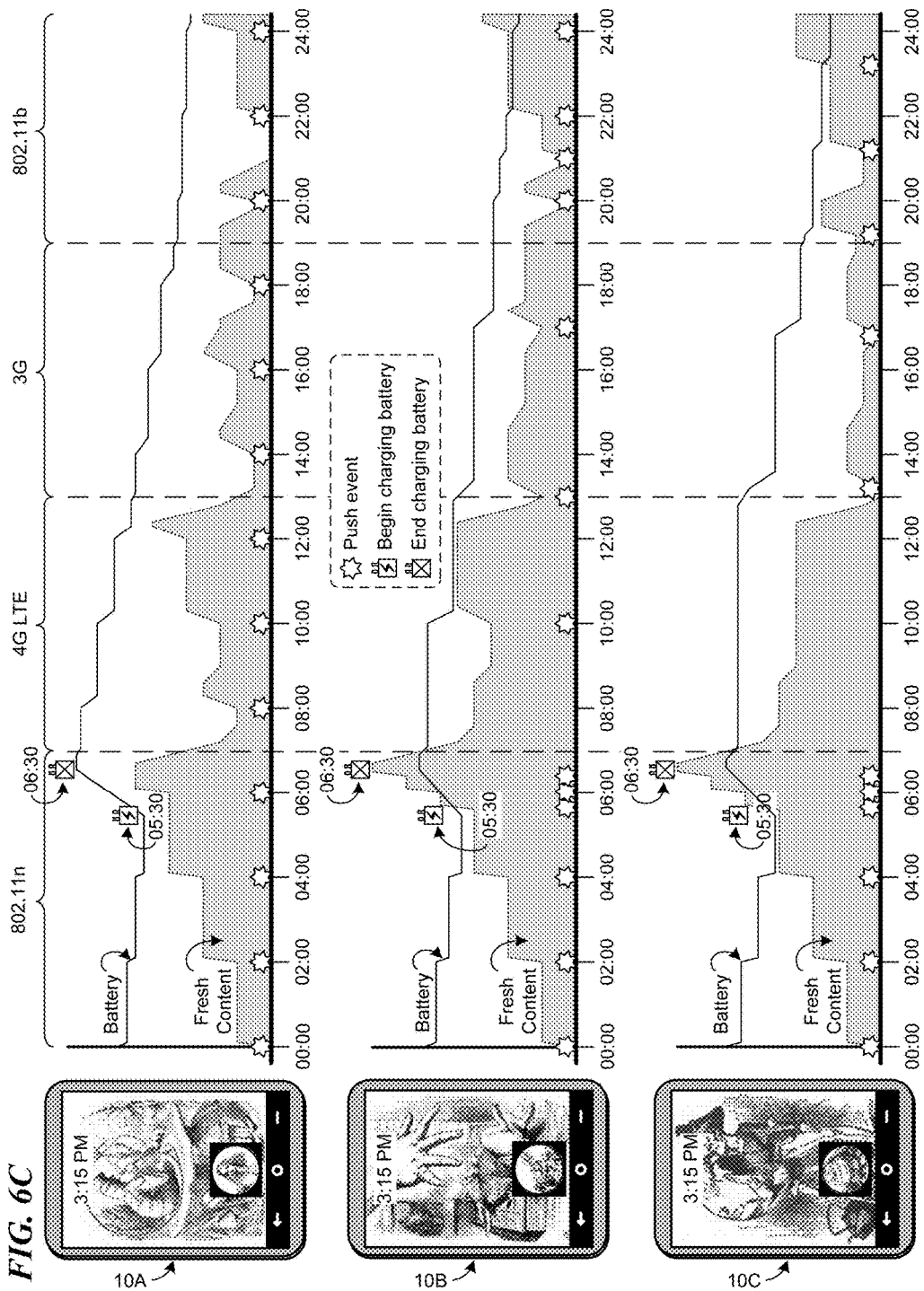

FIGS. 6A-6C illustrate parallel event timelines showing resource consumption for three example mobile computing devices (10A, 10B, and 10C) while receiving and displaying content and other data provided by a content server (e.g., that sends out push events, as denoted by a seven-pointed star in FIGS. 6A-6C) on a continual, periodic, or irregular basis. FIGS. 6A-6C show the variance in resource consumption (particularly, battery power) as between devices 10A-10C over the duration of one day as the example devices transition between different network environments providing different types of network connections, while receiving push events, consuming battery power, and re-charging their batteries. Push events initiated by the content server (e.g., a server associated with a social-networking system) may include pushes of content and/or data (e.g., new content boards, updates to previously-pushed content boards, and an updated content board ordering), notifications that such content and/or data is available for retrieval by the device sending a request to the content server, and/or "wake commands" instructing the receiving device to enter an active state and check for available content and/or data. Any such content and/or data received by the device is cached for display (e.g., caching content boards for display in a cover feed). After the content has been displayed to the user, it may be removed from the cache, if needed, in order to make room for new content. The ebb and flow of new, as-of-yet-undisplayed content residing in the caches of the devices is illustrated by the region shaded in grey.

Devices 10A-10C vary with respect to their hardware and software specifications and configurations, such that their overall power consumption profile ranges from device 10A being the most power-efficient to device 10C being the least power-efficient (with respect to power consumption, for each device, by its respective processor, the screen, and various radios for 4G LTE/3G/802.11abgn network connectivity). For the purpose of this example, device 10B is 25% more power-efficient than device 10C, and device 10A is 50% more power-efficient than device 10C. In addition, for the purpose of this example, the radios provided on each device vary in speed and power consumption in a relatively comparable fashion with respect to other radios on the same device—for example, across all three devices, the 802.11n radio provides the fastest maximum speed, while ranking third in power consumption (less than the 3G radio, but more than the 802.11b radio), while the 4G LTE radio consumes the most power, while ranking third with respect to maximum speed (faster than 3G, but slower than 802.11b).

For the purposes of FIGS. 6A-6C, in order to establish a reasonable comparison of the variance in resource consumption between these three devices (which vary with respect to hardware and software specifications and configurations), the examples presented make several assumptions. First, the users of these three example devices travel together through these different network environments (and therefore connect to the same networks at the same time). As shown in FIGS. 6A-6C, the devices are connected to a 802.11n Wi-Fi network from 00:00 (e.g., home Wi-Fi network) until 07:00, when the users move out of range of the 802.11n Wi-Fi network and connect to a 4G LTE network. At 13:00, the users then move out of range of the 4G LTE network and connect to an older 3G network. Finally, at 19:00, the users move into range of a 802.11b Wi-Fi network (e.g., at a café). Second, throughout the period of time that any particular device is connected to a particular network, a consistent level of bandwidth is provided across all devices and throughout the entire period of time (e.g., from 07:00 to 13:00, when devices 10A-10C are connected to the 4G LTE network, a consistent level of bandwidth is provided to each of devices 10A-10C throughout that six-hour period of time). Third, battery power consumption is primarily driven by operation of the various radios, and consumption by any other cause (e.g., processor, screen) is negligible. Fourth, while plugged in and charging, each of devices 10A-10C is able to handle incoming push events without drawing upon battery power and without slowing down the charging process.

FIG. 6A illustrates parallel event timelines showing battery power consumption for devices 10A-10C while being served content and other data by a content server using an example default schedule for serving content and other data. In the example shown in FIG. 6A, the content server periodically pushes (and devices 10A-10C receive) 2 MB of content and/or data throughout the day, every two hours, on the hour. As shown in FIG. 6A, mobile computing devices 10A-10C consume battery power each time the pushed content and/or data is received from the content server (until the point when the data transfer usage limit is reached, resulting in no further battery power consumption after that point). In addition, as devices 10A-10C move through the different network environments (e.g., 802.11n to 4G LTE to 3G to 802.11b), and must utilize different radios having different power consumption profiles, the rate of battery power consumption varies accordingly (despite the fact that the average rate of data transfer remains the same).

Device 10A, being the most efficient with respect to power consumption, is also the most efficient with respect to charging, and so the user of device 10A (Alice Liddell) need only plug in device 10A for one hour upon waking at 05:30 in order to use device 10A throughout the day. Device 10B, being less efficient than device 10A, displays a "Low Battery" warning at 16:20, prompting the user of device 10B (Blanche Lapin) to plug in and charge device 10B from 17:00 until 18:30, when device 10B prepares to go to another location and shortly arrives within range of the 802.11b network. Since the user of device 10C, which is the least-efficient device, is very much aware of the power consumption limitations of device 10C, device 10C remains plugged in and charging until 05:30, after which the battery only lasts until a "Low Battery" warning is displayed at 14:20. Device 10C is then plugged in and charged from 15:00 to 18:30, which provides sufficient power to last until the data transfer usage limit is reached at 22:06. The users' patterns of consumption of new, un-displayed content over this time period is shown by the shaded grey region.

FIGS. 6B and 6C illustrate parallel event timelines showing battery power consumption for the same three example devices while being served content and other data by a content server using an example resource-control algorithm for serving content and other data. In particular embodiments, the resource-control algorithm may be designed to balance the competing goals of extending battery life and keeping the user well-supplied with fresh content including high-resolution images.

FIG. 6B illustrates operation of an example resource-control algorithm that is designed to maximize both goals discussed above: extending battery life and keeping the user well-supplied with fresh content including high-resolution images. The scenario illustrated in FIG. 6B takes the exact same set of events and circumstances as shown in FIG. 6A (users' patterns of consumption of new, unviewed content, battery charging events, etc.) and applies the example resource-control algorithm to change the pattern of push events to minimize battery power consumption and maximize delivery of new, unviewed content. During periods of battery charging, the content server actively pushes as much new content and/or data as possible, in order to be able to go for longer periods without pushing new content when the battery is getting low.

FIG. 6C illustrates operation of an example resource-control algorithm that is designed to promote a relatively uniform rate of battery consumption across multiple devices. As shown in FIG. 6C, push events are scheduled to wake the less power-efficient devices less often (and less regularly) than the more power-efficient devices, in favor of designing a more strategic schedule (e.g., based on whether the device is plugged in, whether the device is connected to a network using a low-power radio, whether the user has been actively viewing content or not). As can be seen, push events are sent to wake the less power-efficient devices 10B and 10C more often than the more power-efficient device 10A when the devices are plugged in and the battery is being charged (during the period of time from 05:30 to 06:30). Push events are also sent to less power-efficient devices 10B and 10C more often than the more power-efficient device 10A when the devices are connected to a network by a low-power radio, etc. Finally, push events are sent less often (or withheld entirely) if content is not being displayed (e.g., as shown with respect to device 10C from 06:30 to 12:30, when the user of the device may have been in meetings or classes), particularly if the device is connected to a network requiring use of a higher-power radio. In particular embodiments, a device-agnostic power threshold may be specified (e.g., 20% battery charge remaining), such that the content server may stop or reduce the frequency of push events in the schedule if device status information indicates that the power status of the battery is close to the power threshold, and the device is not currently being charged.

In particular embodiments, the server may also modify the schedule of push events based on cost of data consumption (e.g., in a pay-as-you-go data consumption model) and/or data usage transfer limits (e.g., as imposed by the network service provider). The cost of data consumption and/or data usage transfer limits may be estimated based on locale (based on assumptions regarding typical data plan caps in a country) and/or the type of network available to the device (e.g., EDGE vs. GPRS vs. 4G). If a network provider or the device provides information regarding actual data usage transfer limits for the user's service plan, the server may utilize such information in the resource-control algorithm when determining the push event schedule for the particular device.

In particular embodiments, the server may also impose a daily limit on the amount of data downloaded by a given device each day (including data pre-fetching). By imposing a daily cap, the server may be able to achieve a smoothing effect wherein the user is able to utilize at least some data transfer on a daily basis (e.g., thereby avoiding running into a monthly data transfer limit with two weeks left in the month). In addition, the server may be able to ensure that a sufficient amount of data usage is reserved for other operations that the user might conduct on the device. Regardless of the period of time (e.g., day, month, year) associated with the data usage transfer limit, the server may restrict push events (while connected to the network imposing the data usage transfer limit) until the period of time is renewed.

The limit on data usage may also be adjusted based on the type of network to which the device is connected. For example, the server may detect the type of network to which a device is connected and pre-fetch 50 content items when connected to Wi-Fi (since there is typically no limit on data transfer and no incremental cost for data transfer when using a Wi-Fi connection), and only pre-fetch three content items when connected to a 3G network (which typically does impose data transfer usage limits).

When a device is at the data transfer usage limit for one network (e.g., 3G network), the server may only initiate push events when it has detected that the device is connected to a different network (e.g., Wi-Fi network). After those stories, we'll show older stories that we have images for, but that haven't been seen, then finally older stories with images that have already been seen on the device. Over time, as more data becomes available, these newer stories will get images and move to the front of cover feed automatically.

In particular embodiments, the server may also provide down-scaled content (e.g., reducing image size/resolution/type, selecting a single preview frame and a link to a video in lieu of the entire video file, or cropping a music file from four minutes to just a short 20-second audio clip) when connected to an expensive or low-bandwidth network (e.g., 4G LTE). The server may then later provide up-scaled versions of the content when connected to cheaper/higher-bandwidth network (e.g., 802.11b Wi-Fi network). Several versions of a piece of content may be generated and stored and then classified into categories of data transfer usage (e.g., low, medium, high). For example, a large (1920×1080 pixels), high-resolution Joint Photographic Experts Group (JPEG) image may be down-scaled to a smaller (800×480 pixels—scaled appropriately for the size of the screen of mobile computing device 10), low-resolution compressed JPEG image for inclusion in a content board sent to the device while the device is connected to a 3G network, but once the device connects to a Wi-Fi network, the server may detect the device's new network status and send an update to the content board with the original version of the image.

Figure 7:
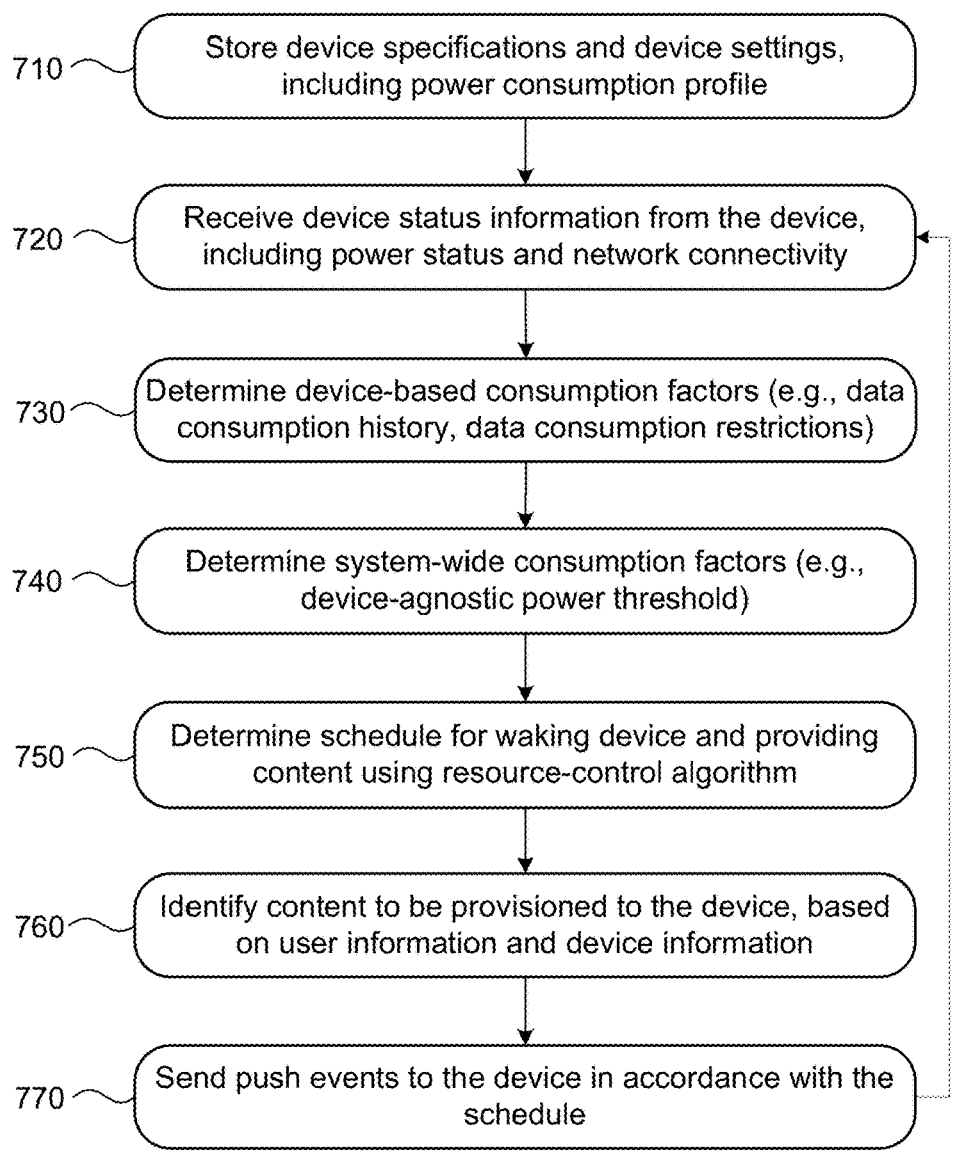
FIG. 7 is a flowchart of steps in an example method for controlling client-side resource consumption by a server.

FIG. 7 is a flowchart of steps in an example method for a server to control client-side resource consumption by applying a resource-control algorithm to modify a schedule for providing a device with new and/or updated content and/or data. In step 710, the server may store device specifications and device settings, including a power consumption profile for the device and/or for particular device features (e.g., networking radios, processor(s), display screen). A power consumption profile comprises information regarding the typical rate of power consumption of a device overall, or of particular device features. The power consumption profile may specify different rates of power consumption for different situations (e.g., the power consumption of a 4G LTE radio may reliably vary based on the device's current location).

In step 720, the server may receive device status information from the device, including power status (e.g., battery charge is currently at 40%, whether the device is currently plugged in and charging) and network connectivity (e.g., the type of network the device is connected to; which radio the device is utilizing to connect to the network; detected available bandwidth; cost, if any, of the network to which the device is connected; security features and settings of the network to which the device is connected).

In step 730, the server may evaluate other factors in order to determine whether it would be appropriate and/or helpful to delay or reduce the frequency of push events, such as, for example, device-based consumption factors: whether the device cache contains a high percentage of fresh (new and unviewed) content, any data transfer usage limits that apply to the network to which the device is currently connected, and the device's current data transfer usage status, etc.

In step 740, the server may determine any system-wide consumption factors (e.g., device-agnostic power threshold). In particular embodiments, the resource-control algorithm may further be designed to control battery power consumption so as to promote a relatively uniform rate of battery consumption across multiple devices, e.g., waking more power-efficient devices more often than less power-efficient devices (generally), waking less power-efficient devices more often than more power-efficient devices when they are plugged in and charging the battery, waking less power-efficient devices more often than more power-efficient devices when they are connected to a network by a low-power radio, etc. In such embodiments, a device-agnostic power threshold may be specified (e.g., 20% battery charge remaining), such that the content server may stop or reduce the frequency of push events in the schedule if device status information indicates that the power status of the battery is close to the power threshold, and the device is not currently being charged.

In step 750, the server may determine a push event schedule for waking the device and providing content, by using the resource-control algorithm. In particular embodiments, the content server may determine (using the resource-control algorithm) and maintain, for each device, a server-side schedule for initiating a server-side command to wake the device and for pushing content and/or other data to the device. In particular embodiments, the content server may send, to each mobile device, a client-side schedule for use with functionality installed on the device in order to initiate client-side commands to wake the mobile device and to pull content and/or other data from the content server. In these embodiments, the content server may maintain the client-side schedule and periodically send an updated version to the device. In particular embodiments, such schedules may be designed to control resource consumption by the device. For example, the schedule of push events may take advantage of battery charging events, periods of connectivity to networks utilizing low-power radios, periods of connectivity to free networks and/or unrestricted networks (e.g., those not having data transfer limitations) in order to extend battery life (and avoid exceeding a charge threshold) and/or reduce network data transfer usage (and avoid exceeding a data transfer limit imposed by a network service provider).

In step 760, the server identifies content for provisioning to user, based on user information and device information (e.g., as described above with respect to cover feeds). For example, a content server associated with a social-networking system may retrieve content posted to the social-networking system by a user's social connections, and compose new content boards and compose updates to previously-provided content boards for a cover feed on the user's mobile computing device 10. In particular embodiments, the server may continually identify content that is a candidate for provisioning to the user, but only actually retrieve/compose/generate the actual content to be provisioned to the user according to the schedule (e.g., immediately before each push event is due, in order to ensure that the freshest content is sent to the device).

In step 770, the server may send push events (e.g., commands to wake mobile computing device 10 or notifications that content is available for retrieval) to the device in accordance with the schedule. As the device receives the push events, the device may send information back to the server (as described in step 720) in order to provide inputs to the resource-control algorithm (e.g., the device's power status and network connectivity status). In alternate embodiments, rather than having the server send out push events, the server may maintain and periodically send, to the device, a schedule for initiating client-side commands to wake the mobile device and to pull the content and/or other data from the server.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
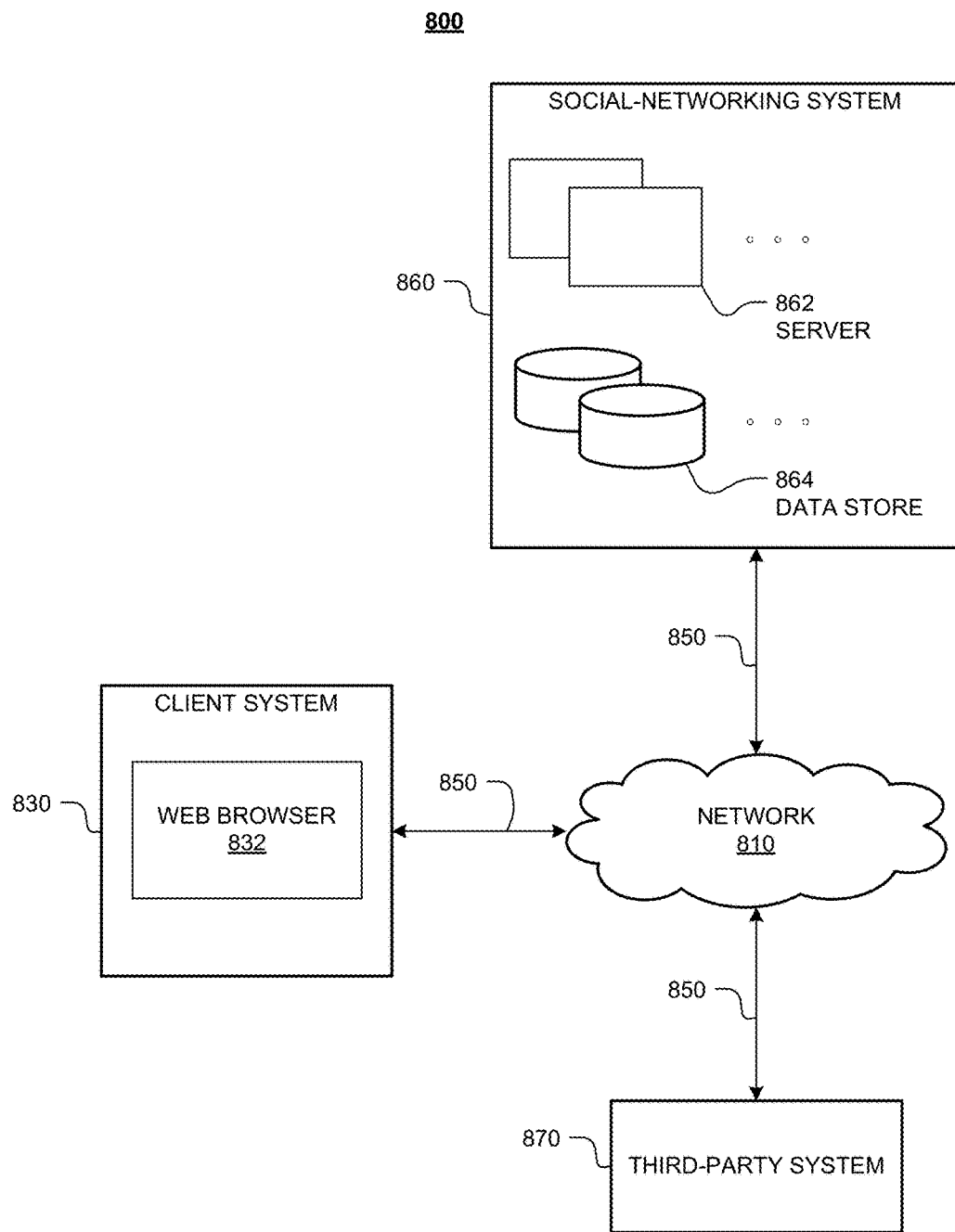
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 864 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 whom they want to be connected to. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
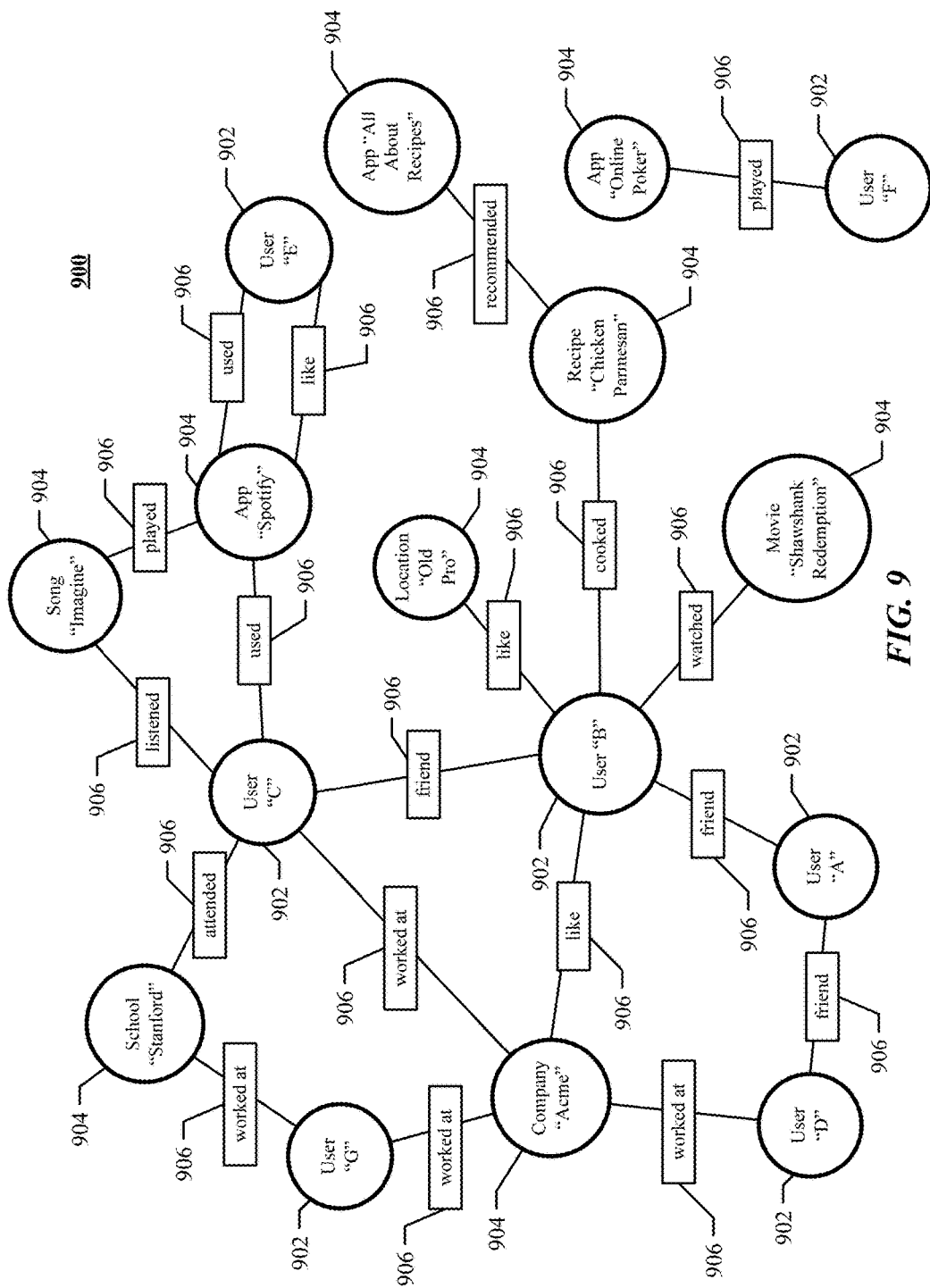
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party server 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 830 to send to social-networking system 860 a message indicating the user's action. In response to the message, social-networking system 860 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 860). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 860. In addition or as an alternative, the social action may be promoted outside or off of social-networking system 860, where appropriate. In particular embodiments, a page may be an on-line presence (such as a webpage or website within or outside of social-networking system 860) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 860. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 860) or RSVP (e.g., through social-networking system 860) to an event associated with the advertisement. In addition or as an alternative, an advertisement may include social-networking-system context directed to the user. For example, an advertisement may display information about a friend of the user within social-networking system 860 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 860 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 860.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 860 to identify those users. In addition or as an alternative, social-networking system 860 may use user-profile information in social-networking system 860 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 860, off or outside of social-networking system 860, or on mobile computing devices of users. When on or within social-networking system 860, such targeting may be directed to users' news feeds, search results, e-mail or other in-boxes, or notifications channels or may appear in particular area of web pages of social-networking system 860, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 860, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 860 or explicit connections of a user to a node, object, entity, brand, or page on social-networking system 860. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. US 2001/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user may make frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Figure 10:
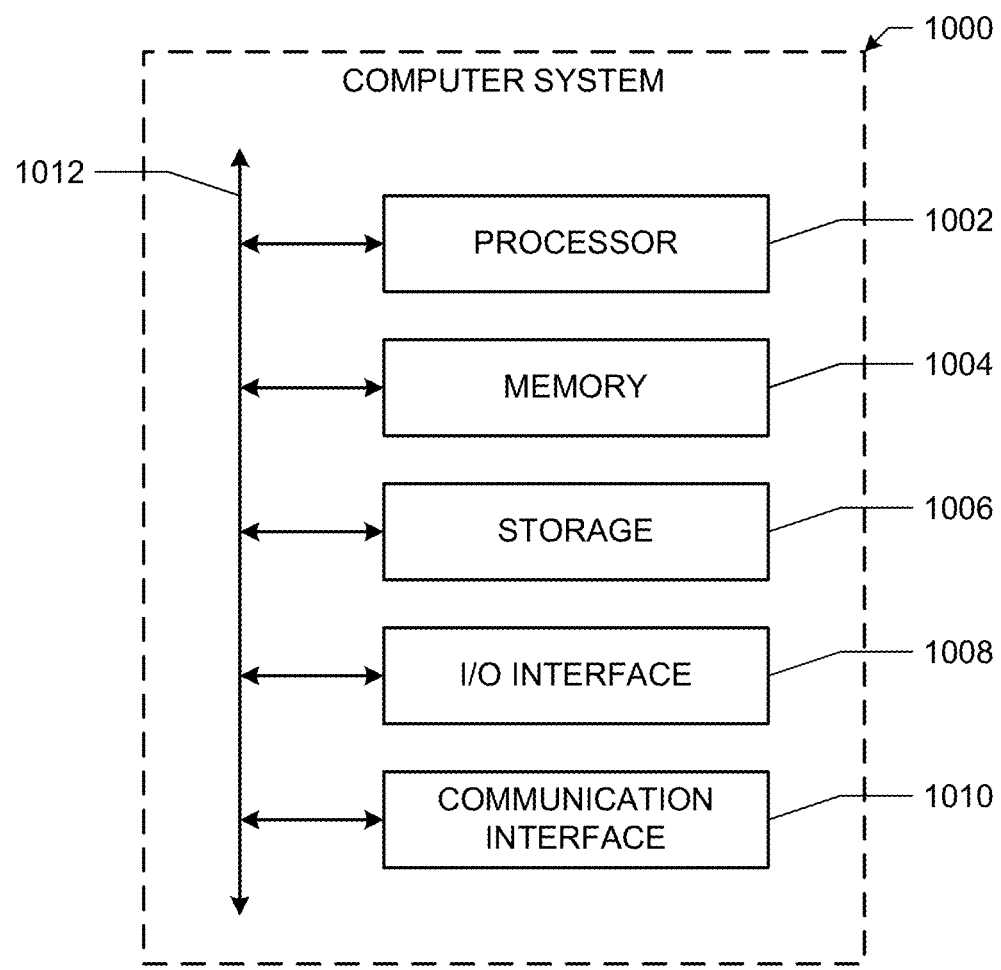
FIG. 10 illustrates an example computing system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, retrieving user information for a user of a social-networking system, wherein the retrieved user information comprises a cover feed interaction history associated with the user;
    by the computing device, determining device information for a device associated with the user, wherein the device information comprises device specifications and settings;
    by the computing device, retrieving, based on the device information or the user information, content associated with the user;
    by the computing device, composing, using the retrieved content, one or more content boards for use in a cover feed displayed on the device, each of the content boards comprising a background image, wherein the composing comprises modifying the retrieved content to adapt to the device based on the device specifications and settings;
    by the computing device, sending the content boards to the device for display as an overlay over an application running on the device, wherein the content boards are ordered based at least in part on the cover feed interaction history;
    by the computing device, retrieving updated information corresponding to one or more social-network interactions with the content included in one or more relevant previously-composed content boards; and
    by the computing device, sending to the device instructions to modify the one or more relevant previously-composed content boards based on the social-network interactions, wherein the updated information indicates that the content that was included in one of the relevant previously-composed content boards has been deleted, and wherein the instructions comprise instructions for the device to delete the one of the relevant previously-composed content boards or instructions to inform the user that the content has been deleted.

2. The method of claim 1, wherein the retrieving the content comprises retrieving content posted by a social connection, metadata associated with the posted content, and related social-networking information.

3. The method of claim 1, wherein the composing a content board further comprises: modification of the content to adapt the content to the user's preferences or settings, or modification of the content to adapt the content according to the privacy settings of other users identified in or associated with the content.

4. The method of claim 1, wherein each of the content boards comprises at least one social interaction feature, and wherein the at least one social interaction feature comprises a content-related social-networking interactive element or a user-related social-networking interactive element, further comprising:
    receiving information about the user's interaction with the at least one social interaction feature.

5. The method of claim 1, wherein the retrieving content associated with the user comprises controlling retrieval of content based on factors associated with the content: degree of separation, affinity, relevance, recency, popularity, proximity, privacy settings of other users identified in or associated with the content, or whether the content is sponsored or not.

6. The method of claim 1, wherein the sending the content boards takes place when a request from the device for new content is received, when an event notification from the device is received, or at periodic intervals.

7. One or more computer-readable non-transitory storage media embodying software that is operable when executed to:
- retrieve user information for a user of a social-networking system, wherein the retrieved user information comprises a cover feed interaction history associated with the user;
- determine device information for a device associated with the user, wherein the device information comprises device specifications and settings;
- retrieve, based on the device information or the user information, content associated with the user;
- compose, using the retrieved content, one or more content boards for use in a cover feed displayed on the device, each of the content boards comprising a background image, wherein the composing comprises modifying the retrieved content to adapt to the device based on the device specifications and settings;
- send the content boards to the device for display as an overlay over an application running on the device, wherein the content boards are ordered based at least in part on the cover feed interaction history;
- retrieve updated information corresponding to one or more social-network interactions with the content included in one or more relevant previously-composed content boards; and
- send to the device instructions to modify the one or more relevant previously-composed content boards based on the social-network interactions, wherein the updated information indicates that the content that was included in one of the relevant previously-composed content boards has been deleted, and wherein the instructions comprise instructions for the device to delete the one of the relevant previously-composed content boards or instructions to inform the user that the content has been deleted.

8. The media of claim 7, wherein the retrieved content comprises content posted by a social connection, metadata associated with the posted content, and related social-networking information.

9. The media of claim 7, wherein the software operable to compose a content board further comprises software operable to perform: modification of the content to adapt the content to the user's preferences or settings, or modification of the content to adapt the content according to the privacy settings of other users identified in or associated with the content.

10. The media of claim 7, wherein the software operable to retrieve content associated with the user comprises software operable to control retrieval of content based on factors associated with the content: degree of separation, affinity, relevance, recency, popularity, proximity, privacy settings of other users identified in or associated with the content, or whether the content is sponsored or not.

11. The media of claim 7, wherein each of the content boards comprises at least one social interaction feature, and wherein the at least one social interaction feature comprises a content-related social-networking interactive element or a user-related social-networking interactive element, wherein the software is further operable when executed to:
- receive information about the user's interaction with the at least one social interaction feature.

12. The media of claim 7, wherein the content boards are sent when a request from the device for new content is received, when an event notification from the device is received, or at periodic intervals.

13. A system comprising:
- one or more processors; and
- a memory coupled to the processors comprising instructions executable by the processors, the processors being operable when executing the instructions to:
  - retrieve user information for a user of a social-networking system, wherein the retrieved user information comprises a cover feed interaction history associated with the user;
  - determine device information for a device associated with the user, wherein the device information comprises device specifications and settings;
  - retrieve, based on the device information or the user information, content associated with the user;
  - compose, using the retrieved content, one or more content boards for use in a cover feed displayed on the device, each of the content boards comprising a background image, wherein the composing comprises modifying the retrieved content to adapt to the device based on the device specifications and settings;
  - send the content boards to the device for display as an overlay over an application running on the device, wherein the content boards are ordered based at least in part on the cover feed interaction history;
  - retrieve updated information corresponding to one or more social-network interactions with the content included in one or more relevant previously-composed content boards; and
  - send to the device instructions to modify the one or more relevant previously-composed content boards based on the social-network interactions, wherein the updated information indicates that the content that was included in one of the relevant previously-composed content boards has been deleted, and wherein the instructions comprise instructions for the device to delete the one of the relevant previously-composed content boards or instructions to inform the user that the content has been deleted.

14. The system of claim 13, wherein the instructions to compose a content board further comprise instructions to perform: modification of the content to adapt the content to the user's preferences or settings, or modification of the content to adapt the content according to the privacy settings of other users identified in or associated with the content.

15. The system of claim 13, wherein each of the content boards comprises at least one social interaction feature, and wherein the at least one social interaction feature comprises a content-related social-networking interactive element or a user-related social-networking interactive element, wherein the processors are further operable when executing the instructions to:
- receive information about the user's interaction with the at least one social interaction feature.

16. The system of claim 13, wherein the content boards are sent when a request from the device for new content is received, when an event notification from the device is received, or at periodic intervals.

17. The system of claim 13, wherein the retrieving the content comprises retrieving content posted by a social connection, metadata associated with the posted content, and related social-networking information.

18. The system of claim 13, wherein the processors operable when executing the instructions to retrieve content associated with the user comprises processors operable when executing the instructions to control retrieval of content based on factors associated with the content: degree of separation, affinity, relevance, recency, popularity, proximity, privacy settings of other users identified in or associated with the content, or whether the content is sponsored or not.

* * * * *